United States Patent
Oh et al.

(10) Patent No.: US 11,305,611 B2
(45) Date of Patent: *Apr. 19, 2022

(54) AIR-CONDITIONING APPARATUS FOR VEHICLE

(71) Applicants: Hyundai Motor Company, Seoul (KR); Kia Motors Corporation, Seoul (KR); Hanon Systems, Daejeon (KR)

(72) Inventors: Man Ju Oh, Yongin-Si (KR); Sang Shin Lee, Suwon-Si (KR); Jae Woong Kim, Hwaseong-Si (KR); So La Chung, Seoul (KR); Yun Sub Chung, Daejeon (KR); Gum Bae Choi, Daejeon (KR)

(73) Assignees: Hyundai Motor Company, Seoul (KR); Kia Motors Corporation, Seoul (KR); Hanon Systems, Daejeon (KR)

( * ) Notice: Subject to any disclaimer, the term of this patent is extended or adjusted under 35 U.S.C. 154(b) by 234 days.

This patent is subject to a terminal disclaimer.

(21) Appl. No.: 16/653,239

(22) Filed: Oct. 15, 2019

(65) Prior Publication Data

US 2020/0338956 A1    Oct. 29, 2020

(30) Foreign Application Priority Data

Apr. 25, 2019 (KR) .......................... 10-2019-0048237

(51) Int. Cl.
*F25B 1/00* (2006.01)
*F25B 49/00* (2006.01)
(Continued)

(52) U.S. Cl.
CPC ..... *B60H 1/00885* (2013.01); *B60H 1/00278* (2013.01); *B60H 1/00321* (2013.01);
(Continued)

(58) Field of Classification Search
CPC ................ B60H 1/00885; B60H 58/26; B60H 1/00278; B60H 1/00321; B60H 1/00392;
(Continued)

(56) References Cited

U.S. PATENT DOCUMENTS 5,549,153 A    8/1996 Baruschke et al.
8,215,432 B2   7/2012 Nemesh et al.
(Continued)

FOREIGN PATENT DOCUMENTS

DE    102007063251 A1    7/2009
DE    102012010697 A1    12/2013
(Continued)

*Primary Examiner* — Davis D Hwu
(74) *Attorney, Agent, or Firm* — Morgan, Lewis & Bockius LLP

(57) ABSTRACT

An air-conditioning apparatus for a vehicle may include a radiator module; a refrigerant module; a hot portion for heat-exchanging with a condenser and a heater core of an internal air-conditioning module; a cold portion for heat-exchanging with an evaporator and a cooling core of the internal air-conditioning module; an electric portion for heat-exchanging with an electric component; a battery portion for heat-exchanging with a high-voltage battery; a connection module for connecting the hot portion, the electric portion, or the battery portion to any one or more radiators among a first radiator, a second radiator, and a third radiator; and a control unit configured of controlling the operations of a compressor and a valve.

15 Claims, 20 Drawing Sheets

(51) Int. Cl.
    *B60H 1/00*     (2006.01)
    *B60L 58/26*     (2019.01)

(52) U.S. Cl.
    CPC ..... *B60H 1/00392* (2013.01); *B60H 1/00485* (2013.01); *B60L 58/26* (2019.02); *B60H 2001/00942* (2013.01); *B60Y 2200/91* (2013.01); *B60Y 2300/91* (2013.01)

(58) Field of Classification Search
    CPC ...... B60H 1/00485; B60H 2001/00942; B60Y 2200/91; B60Y 2300/91
    USPC ....................................................... 62/228.1
    See application file for complete search history.

(56) References Cited

U.S. PATENT DOCUMENTS

| | | | |
|---|---|---|---|
| 8,336,319 | B2 | 12/2012 | Johnston et al. |
| 8,402,776 | B2 | 3/2013 | Johnston et al. |
| 2013/0284415 | A1* | 10/2013 | Katoh .................. B60H 1/3227 165/175 |
| 2014/0041826 | A1 | 2/2014 | Takeuchi et al. |
| 2015/0258875 | A1 | 9/2015 | Enomoto et al. |
| 2016/0107506 | A1 | 4/2016 | Johnston |
| 2016/0339767 | A1 | 11/2016 | Enomoto et al. |
| 2019/0168578 | A1 | 6/2019 | Kim |
| 2019/0176571 | A1 | 6/2019 | Oh |
| 2019/0308491 | A1 | 10/2019 | Lee et al. |
| 2020/0346523 | A1 | 11/2020 | Oh et al. |
| 2020/0353796 | A1 | 11/2020 | Oh |
| 2020/0398636 | A1 | 12/2020 | He et al. |

FOREIGN PATENT DOCUMENTS

| | | |
|---|---|---|
| DE | 102014111971 A1 | 2/2016 |
| DE | 112014005360 T5 | 8/2016 |
| JP | 2019-031109 A | 2/2019 |
| KR | 10-1448656 B1 | 10/2014 |
| KR | 10-1787503 B1 | 10/2017 |
| KR | 10-2018-0093184 A | 8/2018 |
| KR | 10-2019-0033115 A | 3/2019 |
| KR | 20190127219 A | 11/2019 |

* cited by examiner

AIR-CONDITIONING APPARATUS FOR VEHICLE

CROSS REFERENCE TO RELATED APPLICATION

The present application claims priority to Korean Patent Application No. 10-2019-0048237 filed on Apr. 25, 2019, the entire contents of which is incorporated herein for all purposes by this reference value.

BACKGROUND OF THE DISCLOSURE

Field of the Disclosure

The present invention relates to an air-conditioning apparatus for a vehicle, which may use by effectively dividing or integrating a radiator, thereby maximizing the air-conditioning efficiency, and significantly reducing the amount of refrigerant used to maximally cope with the environmental problems as well.

Description of Related Art

A radiator for the vehicle is a configuration which is mounted in front of a vehicle to heat-dissipate through the traveling wind. This has been used to heat-dissipate engine coolant in a conventional internal combustion engine vehicle, or as the heat-dissipating function, a condenser has been mounted in front of the vehicle similar to the radiator to be used to cool the refrigerant.

However, as an electric vehicle is recently spread, the waste heat of the engine is disappearing, and there has a technical problem in that it is required to use very expensive refrigerant or significantly reduce the amount of refrigerant used due to the environmental regulations for refrigerant.

Therefore, required is a new concept of an air-conditioning circuit for a vehicle, which may receive both the energy aspect and the environmental aspect, maximally reduce the amount of refrigerant used and increase the amount of coolant used instead, increase the number of radiators, and use by dividing or integrating the radiator more effectively.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an air-conditioning apparatus configured for a vehicle, which may use by effectively dividing or integrating a radiator, maximizing the air-conditioning efficiency, and significantly reducing the amount of refrigerant used to maximally cope with the environmental problems as well.

An air-conditioning apparatus configured for a vehicle for achieving the object may include a radiator module including a first radiator, a second radiator, and a third radiator; a refrigerant module having a compressor, an expansion valve, a condenser, and an evaporator, through which refrigerant is circulated; a hot portion through which coolant flows and for heat-exchanging with the condenser and a heater core of an internal air-conditioning module; a cold portion through which the coolant flows and for heat-exchanging with the evaporator and a cooling core of the internal air-conditioning module; an electric portion through which the coolant flows and for heat-exchanging with an electric component; a battery portion through which the coolant flows and for heat-exchanging with a high-voltage battery; a connection module having a plurality of coolant lines and a valve, and for connecting the hot portion, the electric portion, or the battery portion to at least one of the first radiator, the second radiator, and the third radiator; and a control unit configured of controlling the operations of the compressor and the valve.

The control unit may control the connection module so that the number of the radiators to which the electric portion or the battery portion is connected is changed according to the degree at which the heat-dissipation of the electric component or the high-voltage battery is required.

When all of the electric component, the high-voltage battery, and the interior of the vehicle require the cooling, the control unit may control the connection module so that the electric portion is fluidically connected to the first radiator, the battery portion is fluidically connected to the second radiator, and the hot portion is fluidically connected to the third radiator, and may drive the compressor.

When both the high-voltage battery and the interior of the vehicle require the cooling, the control unit may control the connection module so that the battery portion is fluidically connected to the first radiator or the second radiator and the hot portion is fluidically connected to the third radiator, and may drive the compressor.

When both the high-voltage battery and the interior of the vehicle require the cooling of a certain reference value or more, the control unit may control the connection module so that the hot portion is connected to the radiator and drive the compressor, and may control so that the coolant circulates the cold portion, the cooling core, and the battery portion in the present order.

When all of the electric component, the high-voltage battery, and the interior of the vehicle require the cooling of a certain reference value or more, the control unit may control the connection module so that the electric portion is fluidically connected to the first radiator and the second radiator and the hot portion is fluidically connected to the third radiator and drive the compressor, and may control so that the coolant flowing through the cold portion is branched to the electric portion and the cooling core and the coolant flowing through the cooling core and the battery portion and the coolant flowing through the electric portion are joined together.

When the interior of the vehicle requires the maximum cold performance, the control unit may control the connection module so that the hot portion is fluidically connected to the first radiator, the second radiator, and the third radiator, and may drive the compressor.

When the high-voltage battery is being charged in a state where a vehicle has been stopped, the control unit may control the connection module so that the hot portion is fluidically connected to the first radiator, the second radiator, and the third radiator and drive the compressor, and may control so that the coolant circulates the cold portion, the cooling core, and the battery portion in the present order.

When the internal heating is required, the control unit may control the connection module so that the cold portion does not flow the coolant to the cooling core and supplies the coolant to the radiator module and the hot portion supplies the coolant to the heater core, and may drive the compressor.

When the internal heating and the cooling of the high-voltage battery are simultaneously required, the control unit may control the connection module so that the cold portion and the battery portion flow the coolant to the radiator module and the hot portion supplies the coolant to the heater core, and may drive the compressor.

When the internal heating and dehumidification are simultaneously required, the control unit may control the connection module so that the cold portion supplies the coolant to the cooling core and the radiator module and the hot portion supplies the coolant to the heater core, and may drive the compressor.

When the internal heating is required, the control unit may control the connection module so that the coolant flowing through the cold portion flows through the electric portion and the radiator module to be then joined together and the hot portion supplies the coolant to the heater core, and may drive the compressor.

When the internal heating and the cooling of the high-voltage battery are required, the control unit may control the connection module so that the coolant flowing through the cold portion flows through the electric portion, the first radiator, and the third radiator, the hot portion supplies the coolant to the heater core, and the battery portion supplies the coolant to the second radiator, and may drive the compressor.

The air-conditioning apparatus configured for the vehicle of the present invention may further include an electric heater provided on the coolant line for fluidically connecting the hot portion with the heater core to heat the coolant, and when the internal heating and the temperature-rising of the high-voltage battery are required, the control unit may control so that the cold portion supplies the coolant to the radiator module and the coolant flowing through the hot portion is branched to flow through the electric heater and the battery portion, respectively to be then joined together to flow to the heater core.

When a vehicle is stopped and the internal heating is required, the control unit may control the control module so that the coolant flowing through the cold portion flows to the radiator module and the coolant flowing through the hot portion flows to the electric heater and the heater core, and may drive the compressor.

According to the air-conditioning apparatus configured for the vehicle of the present invention, it is possible to use by effectively dividing or integrating a radiator, maximizing the air-conditioning efficiency, and significantly reducing the amount of refrigerant used to maximally cope with the environmental problems as well.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and other advantages of the present invention

Figure 1:
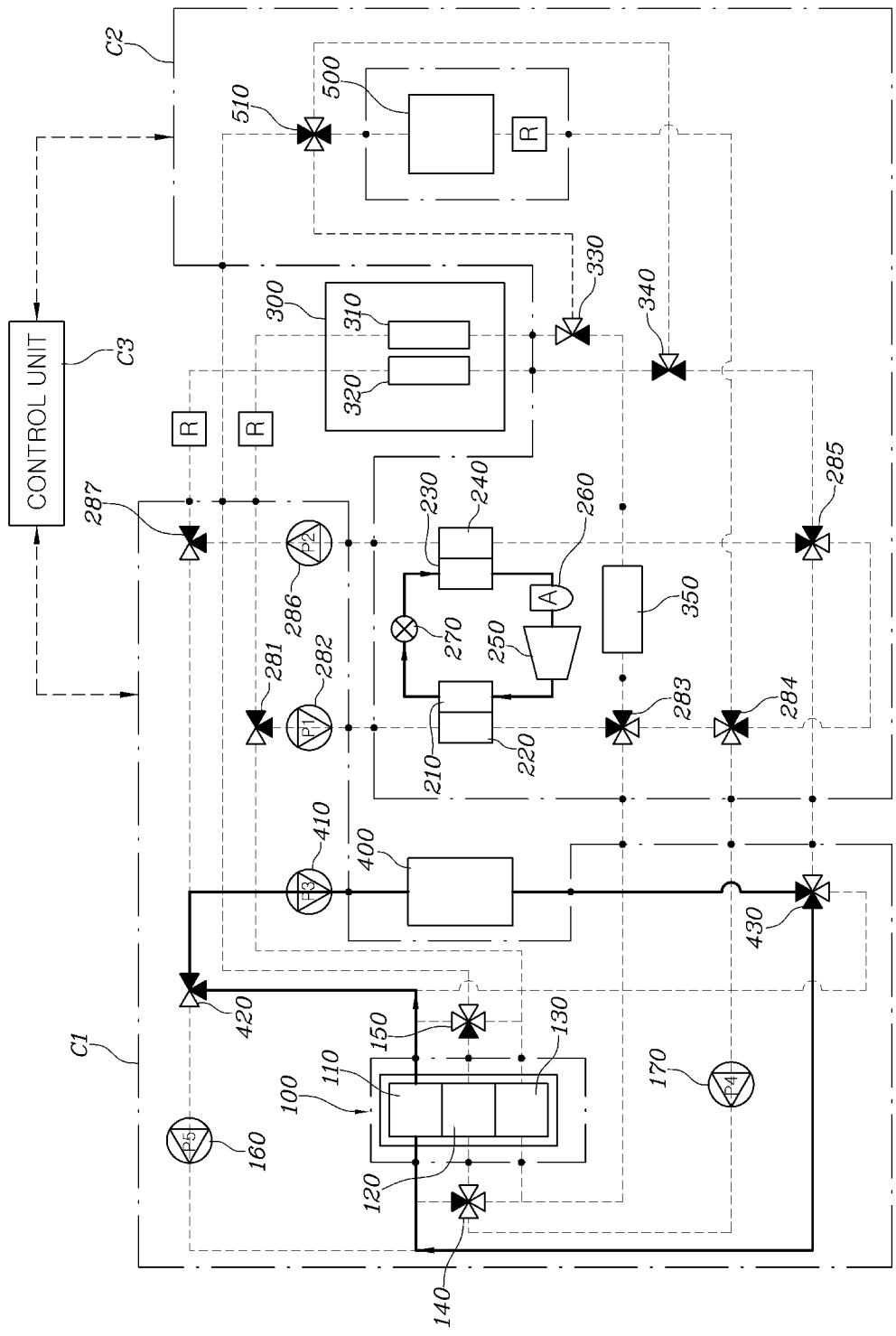
FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, and FIG. 20 are diagrams illustrating an operation and the flow of coolant for each mode of an air-conditioning apparatus configured for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference value numbers refer to the same or equivalent portions of the present invention throughout the several figures of the drawing.

DETAILED DESCRIPTION OF THE DISCLOSURE

Reference value will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

FIGS. 1 to 20 are diagrams illustrating an operation and the flow of coolant for each mode of an air-conditioning apparatus configured for a vehicle according to an exemplary embodiment of the present invention.

An air-conditioning apparatus configured for a vehicle of the present invention may also be applied to a vehicle having an engine, but is suitable for eco-friendly vehicles such as an electric vehicle and a hydrogen fuel cell vehicle having no engine. This is because there is no heat source for heating in the absence of the engine, such that heating may include use of refrigerant or the energy through electricity.

Furthermore, in such a vehicle, since the necessity and degree of the air-conditioning required for the electric components such as a motor, an inverter, and a converter, a high-voltage battery, and an internal air-conditioning are different, respectively, it is necessary to have a large number of radiators configured for corresponding to these, respectively and altogether, to have a variable configuration configured for using by integrating these radiators while using by dividing them as necessary.

For the present purpose, as in FIG. 1, the air-conditioning apparatus configured for the vehicle according to an exemplary embodiment of the present invention includes a radiator module 100 including a first radiator 110, a second radiator 120, and a third radiator 130; a refrigerant module having a compressor 250, an expansion valve 270, a condenser 210, and an evaporator 230, through which refrigerant is circulated; a hot portion 220 through which coolant flows and for heat-exchanging with the condenser 210 and a heater core 310 of an internal air-conditioning module 300; a cold portion 240 through which the coolant flows and for heat-exchanging with the evaporator 230 and a cooling core 320 of the internal air-conditioning module 300; an electric portion 400 through which the coolant flows and for heat-exchanging with an electric component; a battery portion 500 through which the coolant flows and for heat-exchanging with a high-voltage battery; a connection module having a plurality of coolant lines and a valve, and for connecting the hot portion 220, the electric portion 400, or the battery portion 500 to any one or more radiators among the first radiator 110, the second radiator 120, and the third radiator 130; and a control unit C3 for controlling the operations of the compressor 250 and the valve. The connection module may be divided into two physical units, and in the instant case, valves 140 and 150, 420, 430, 281, 287 and pumps 160, 170, 410, 282, 286 are configured on a first connection module C1. As such, valves 283, 284, 285, 330, 340, 510 are configured on a second connection module C2. As described above, the present invention includes the connection modules C1, C2 divided into two physical configurations, and connects each configuration such as the radiator module, the electric portion, or the battery portion to the connection module by the coolant line, very making the size compact.

The radiator module 100 requires three radiators independently configured. The first radiator 110, the second radiator 120, and the third radiator 130 have independent coolant flow paths, respectively, and may be physically coupled as one module. Therefore, the first radiator 110, the second radiator 120, and the third radiator 130 have independent inlets and outlets, respectively, and the plurality of inlets and outlets are provided with a multi-way valve, respectively, to heat-dissipate separately or heat-dissipate integrally so that the degree of freedom of the flow path is very high.

As such, the refrigerant module having the compressor 250, the expansion valve 270, the condenser 210, and the evaporator 230, through which refrigerant is circulated, provided therein is prepared. Since there is no heat source in the absence of an engine, heating is possible by use of the heat of the condenser 210, and cooling is performed by use of the evaporator 230 when the cooling is required. As such, the condenser 210 is not mounted in front of the vehicle but connected to the evaporator 230 through the shortest path, and configured as one module together with the compressor 250, the expansion valve 270, and the accumulator 260, significantly reducing the amount of refrigerant used. In the instant case, this is a structure advantageous to protect the environment and simultaneously, save the cost because there is no need to use the expensive refrigerant.

As such, the hot portion 220 through which the coolant flows and for heat-exchanging with the condenser 210 and the heater core 310 of the internal air-conditioning module 300 and the cold portion 240 through which the coolant flows and for heat-exchanging with the evaporator 230 and the cooling core 320 of the internal air-conditioning module 300 are prepared. The connection with the coolant line is important in an exemplary embodiment of the present invention because the flow path of the refrigerant is extremely reduced, and the heating capacity of the condenser 210 and the cooling capacity of the evaporator heat-exchange through the coolant and are used at the point away from each other.

For the present purpose, the condenser 210 is connected to the hot portion 220 to be heat-exchangeable therebetween in a method such as conduction, and the hot portion 220 exchanges heat with the heater core 310 of the internal air-conditioning module 300 through the coolant again. Furthermore, the evaporator 230 is connected to the cold portion 240 to be heat-exchangeable therebetween in the method such as conduction, and the cold portion 240 exchanges heat with the cooling core 320 of the internal air-conditioning module 300 through the coolant again. The internal air-conditioning module 300 is provided with a blower, a door, etc. so that the air is discharged into the internal after passing through the heater core 310, the cooling core 320, or both thereof, facilitating the internal air-conditioning.

As such, the electric portion 400 through which the coolant flows and for heat-exchanging with an electric component such as a motor is prepared, and the battery portion 500 through which the coolant flows and for heat-exchanging with the high-voltage battery is prepared. The electric portion 400 and the battery portion 500 are connected to the radiators by the coolant for heat-dissipation.

For the present purpose, the connection module is prepared. The connection module includes the plurality of coolant lines and the valve, and controls the valve to adjust to connect the hot portion 220, the electric portion 400, or the battery portion 500 to any one of the first radiator 110, the second radiator 120, and the third radiator 130, respectively, or to two or more radiators simultaneously, as necessary.

As such, the control unit C3 for controlling the operations of the valve or the pump of the connection module, and the compressor to implement various modes is provided.

The present invention may be implemented in the following modes.

| | | | Conditions | | | |
|---|---|---|---|---|---|---|
| Mode | | Control contents | External air temperature (° C.) | Compressor | Charge | Vehicle speed (km/hr) |
| External air cooling mode | 1-1~1-2 | Electric component external air cooling mode | 10~20 | OFF | X | <120 |
| | | | | | | ≥120 |
| | 1-3 | Electric component maximum external air cooling mode | | | | MAX(hill) |
| | 1-4~1-5 | Battery external air cooling mode | | OFF | 0 (slow charge) | 0 |
| | | | | | 0 (rapid charge) | 0 |
| | 1-6 | Electric component & battery external air cooling mode | | OFF | X | <120 |
| | | | | | | ≥120 |
| Cold mode | 2-1 | Electric component & battery external air cooling + internal cold mode | >20 | ON | X | <60 |
| | 2-2 | Electric component external air cooling + internal & battery cold mode 1 | >30 | ON | X | ≥120 |

-continued

| Mode | | Control contents | External air temperature (° C.) | Compressor | Charge | Vehicle speed (km/hr) |
|---|---|---|---|---|---|---|
| | 2-3 | Electric component cooling & cold + internal & battery cold mode 1 | | | | MAX(hill) |
| | 2-4 | Internal cold mode | >25 | ON | X | 0 |
| | 2-5 | Internal & battery cold mode (cold storage function) | | ON | ◯ | 0 |
| | 2-6 | Electric component external air cooling + internal & battery cold mode 2 | >20 | ON | X | <100 |
| | 2-7 | Electric component cooling & cold + internal & battery cold mode 2 | | | | MAX(hill) |
| Heating & Dehumidifying mode | 3-1 | Internal heating mode (heat storage function) | −5~10 | ON | ◯ (or X) | 0(or <30) |
| | 3-2 | Dehumidifying mode (heat storage function) | | | | |
| | 3-3 | Internal heating & dehumidifying mode | −5~5 | ON | X | >30 |
| | 3-4 | Electric component & battery external air cooling + internal heating & dehumidifying mode | 5~15 | | | >30 |
| | 3-5 | Internal heating & battery temperature-rising mode | −20~−5 | ON | X | >1 |
| | 3-6 | Internal heating & battery temperature-rising & dehumidifying mode 1 | | | X | >1 |
| | 3-7 | Internal heating & battery temperature-rising & dehumidifying mode 2 (heat storage mode) | | | ◯ | 0 |

As described above, the present invention is largely controlled by an external air cooling mode for cooling various portions by use of external air, a cold mode for performing cooling by use of refrigerant, and a heating and dehumidifying mode for performing heating by use of refrigerant, waste heat, and electrical energy.

FIGS. 1 to 6 are diagrams relating to the external air cooling mode, FIG. 7, FIG. 8, FIG. 9, FIG. 10, FIG. 11, FIG. 12, and FIG. 13 are diagrams relating to the cold mode, and FIGS. 14 to 20 are diagrams relating to the heating and dehumidifying mode.

Firstly, the external air cooling mode will be described with reference value to FIGS. 1 to 6. In the instant case, cold is possible only with the external air or the traveling wind. Therefore, the control unit may control the connection module so that the number of radiators to which the electric portion or the battery portion is connected is changed according to the degree at which the heat-dissipation of the electric component or the high-voltage battery is required.

FIG. 1 is a case where when the medium-low external air temperature, that is, the external air heat load is low, the user does not turn on the compressor and the high-voltage battery does not generate heat largely either to become a state of 35° C.~40° C., such that there is no demand for the cooling through refrigerant. This case is a case where as a case where only the electric component requires the cooling, the valves 140, 150, 420, 430 are controlled so that the coolant circulates only the first radiator 110 and the electric portion 400.

Figure 2:
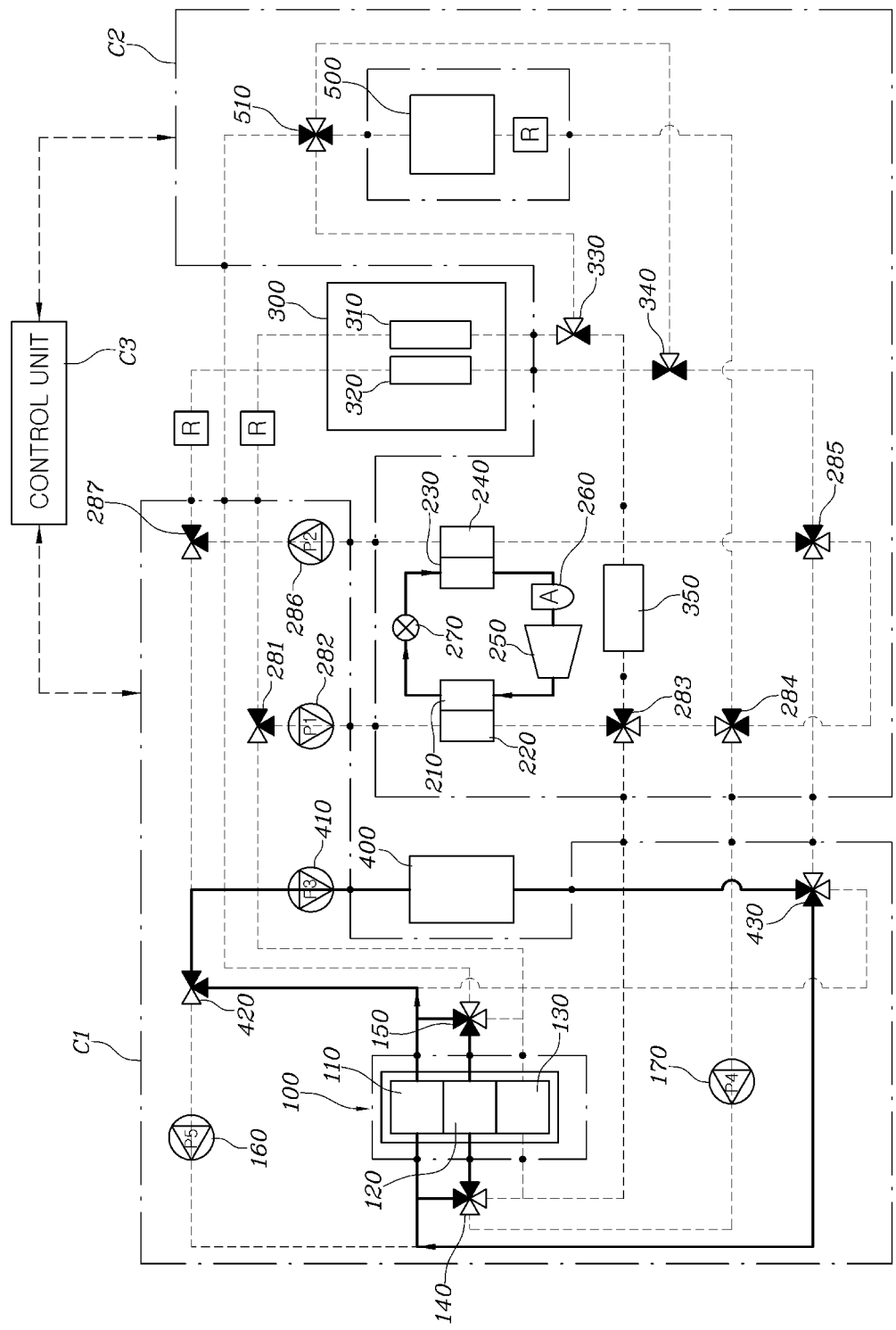
Figure 3:
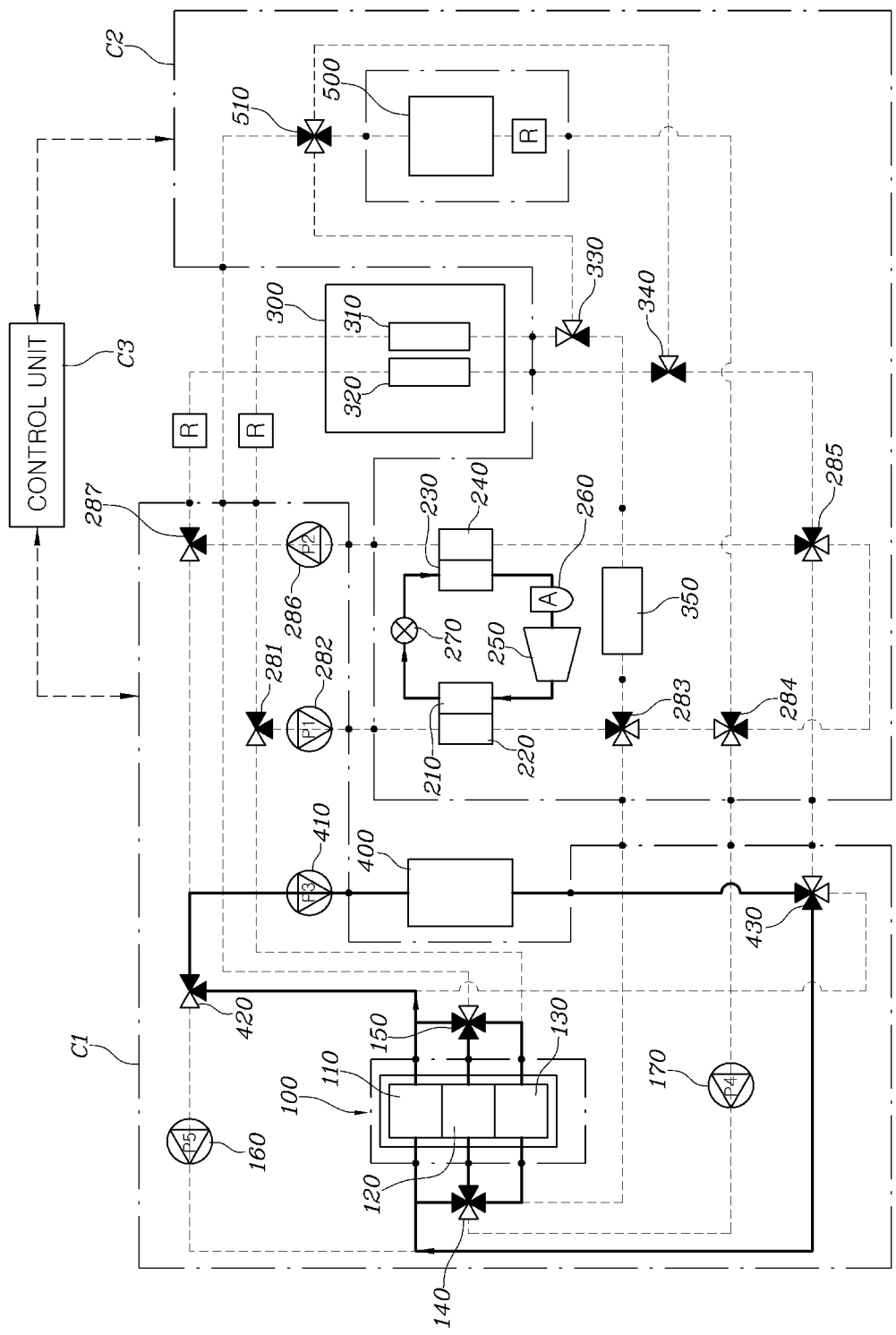

As such, as in FIG. 2, when the heat-generation of the electric component is large, the valves 140, 150 are controlled so that the electric portion 400 may simultaneously use the first radiator 110 and the second radiator 120. As such, as in FIG. 3, it is also possible to use all of the first radiator 110, the second radiator 120, and the third radiator 130.

Figure 4:
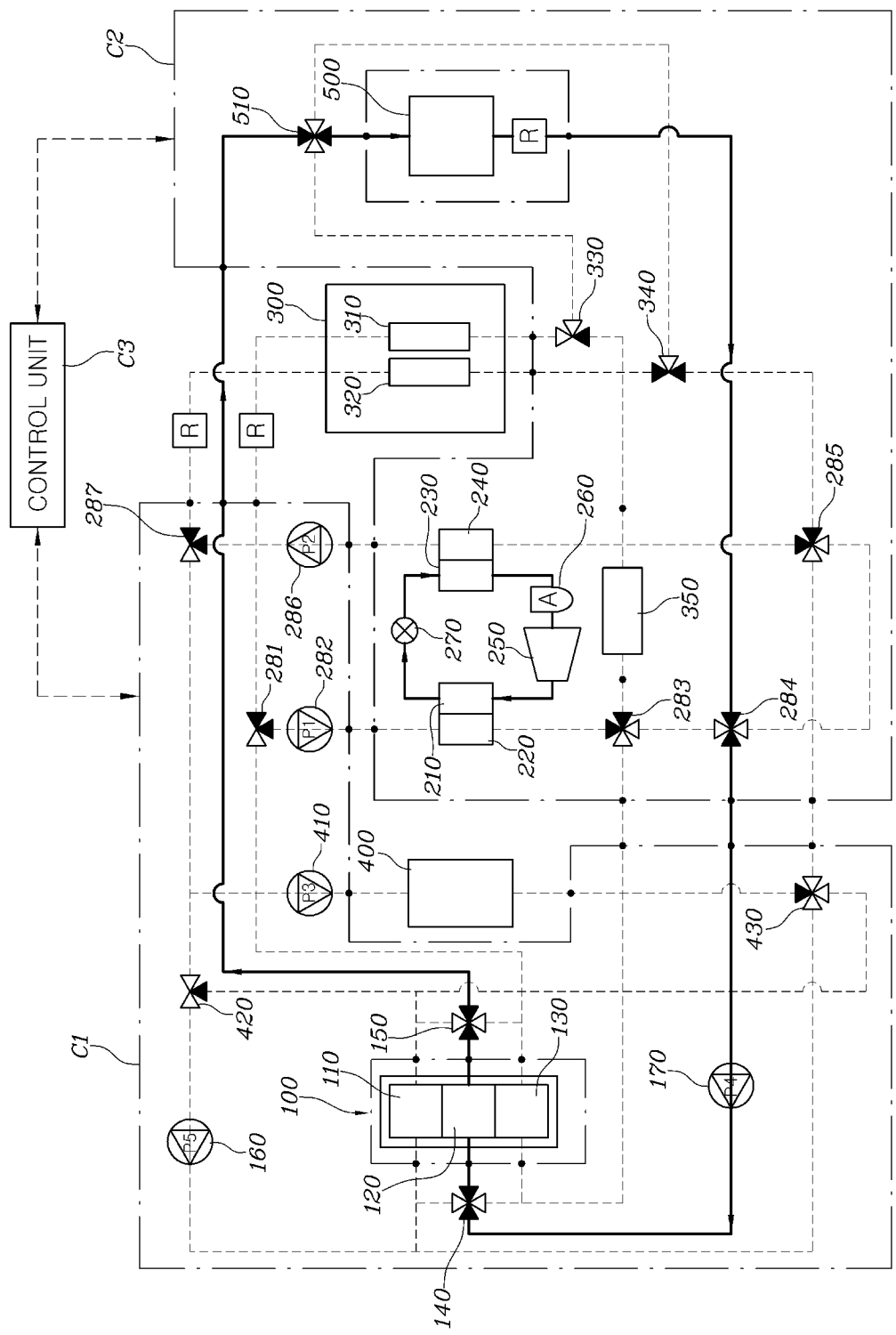
Figure 5:
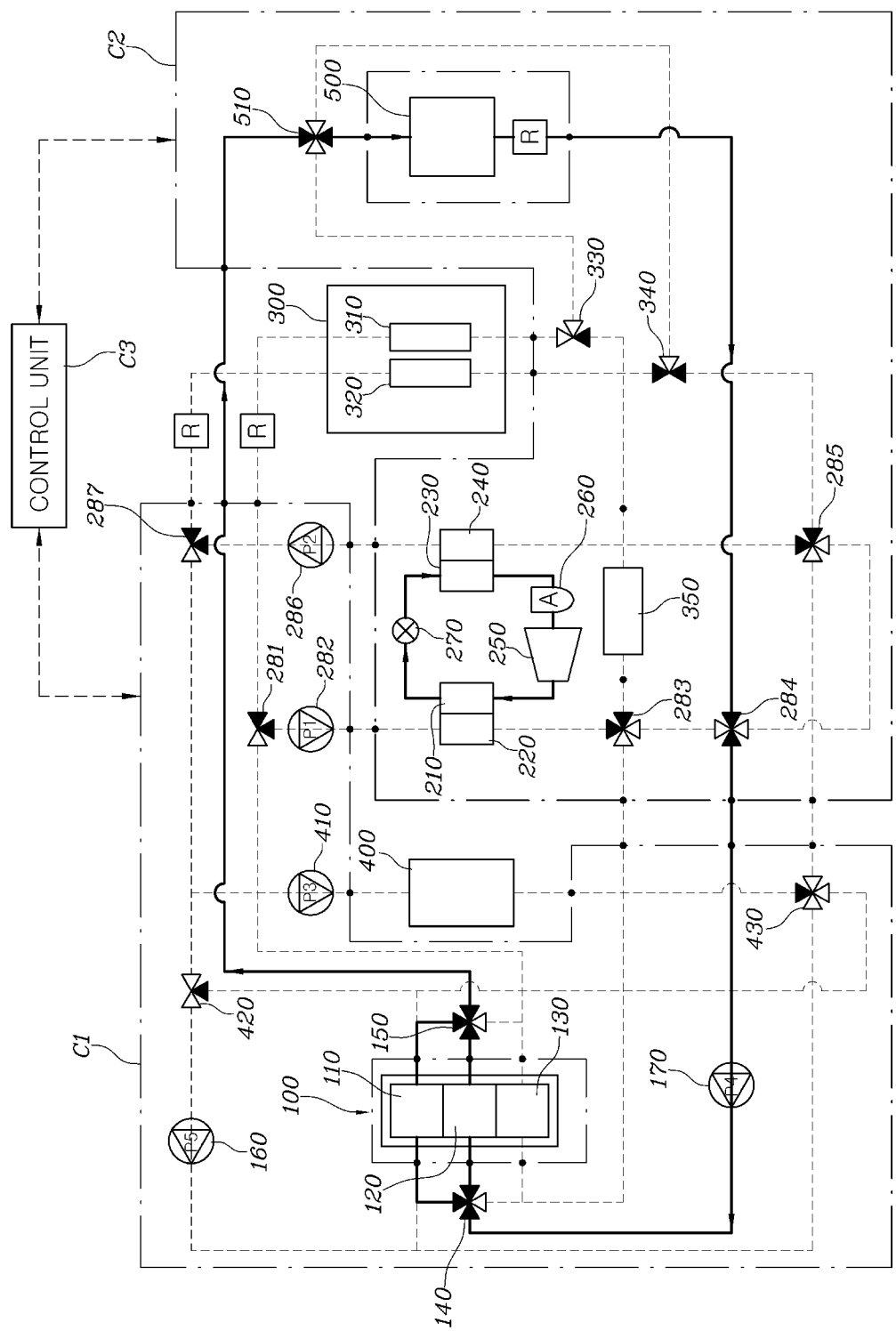

FIG. 4 is a case where the vehicle is stopped and performs only charge, and the external air temperature is not very high, and in the instant case, the battery portion 500 may be connected to the second radiator 120 to cool the battery. This may also be implemented by controlling the pump 170 and the valves 140, 150, 510, 284. FIG. 5 is a case of heat-dissipating the high-voltage battery by use of both the first radiator 110 and the second radiator 120 because the heat-generation of the battery is high.

Figure 6:
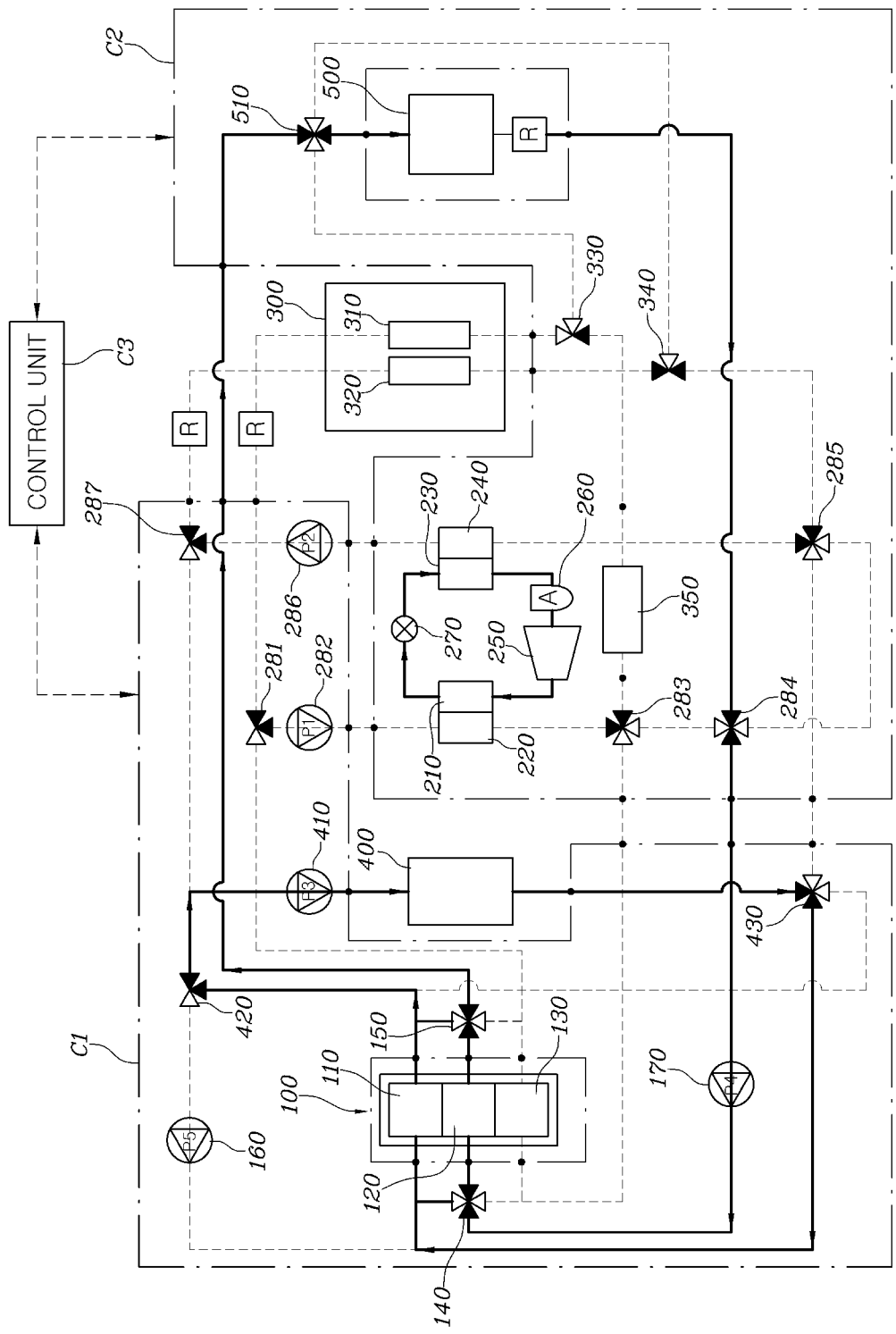

As such, FIG. 6 is a case where both the battery and the electric component require the heat-dissipation, and in the case of cooling them by use of the external air, the valves 140 and 150 are controlled to cool the electric portion 400 through the first radiator 110 and to cool the battery portion 500 through the second radiator 120, these cooling line are separated to perform the cooling independently, such that it is possible to perform two types of cooling, and fulfill the cooling demand independently.

FIG. 7, FIG. 8, FIG. 9, FIG. 10, FIG. 11, FIG. 12, and FIG. 13 are diagrams relating to a cold mode. Firstly, when all of the electric component, the high-voltage battery, and the interior of the vehicle require the cooling, the control unit C3 may control the connection module so that the electric portion 400 is connected to the first radiator 110, the battery portion 500 is connected to the second radiator 120, and the hot portion 220 is connected to the third radiator 130, and may drive the compressor 250.

Figure 7:
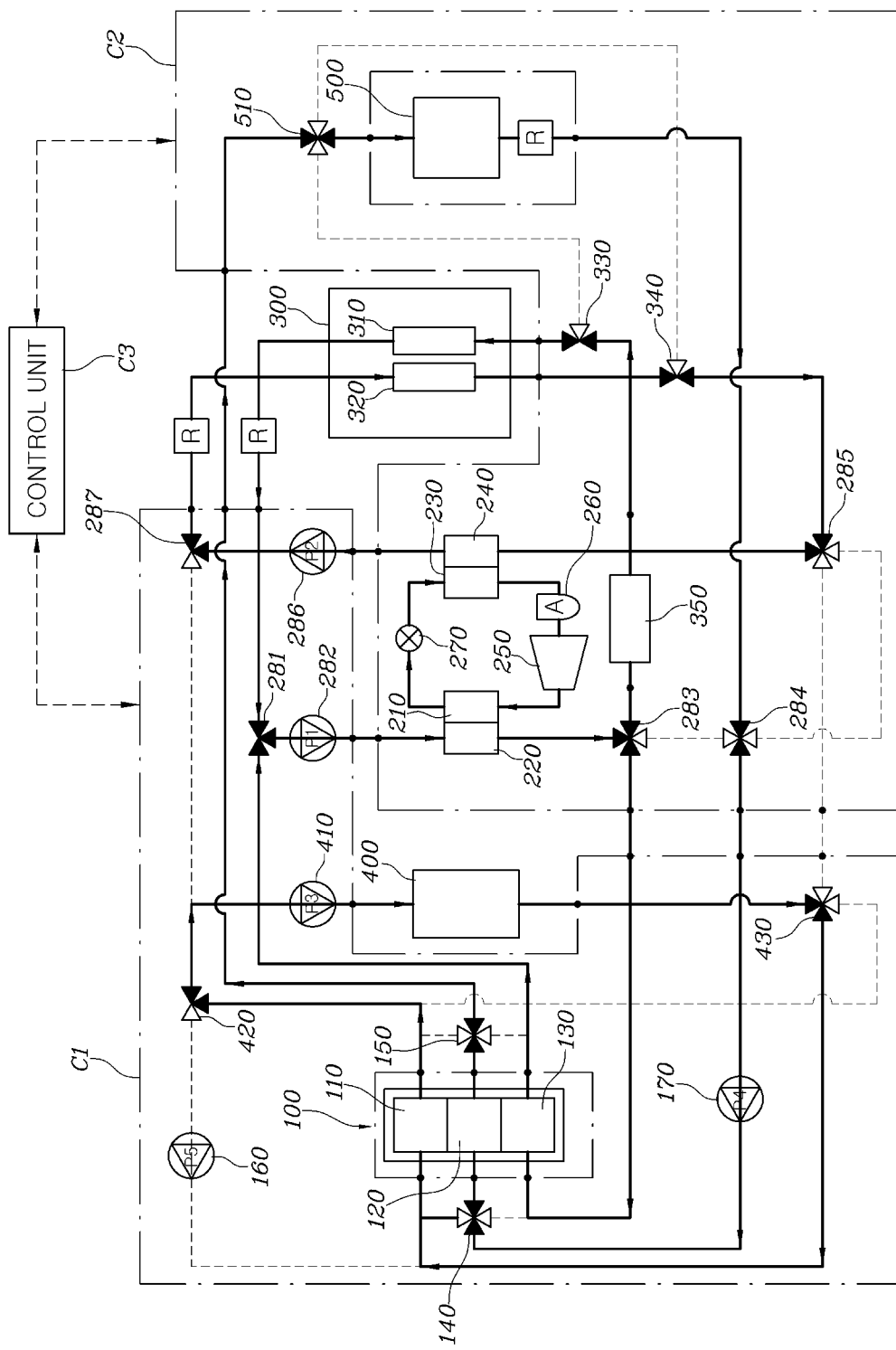

That is, as in FIG. 7, the electric component and the high-voltage battery are cooled by the external air, and when the internal cold is required, the compressor is driven, and the condenser 210 may heat-dissipate through the hot portion 220 and the third radiator 130, performing three types of independent cooling. As such, in the instant case, the coolant flowing through the hot portion 220 is branched through the valve 283 to partially flow toward the heater core 310 side as well, such that hot air and cold air may also be mixed in the internal air-conditioning module 300 to be discharged into the internal at an appropriate temperature.

As such, when both the high-voltage battery and the interior of the vehicle require the cooling, the control unit C3 may control the connection module so that the battery portion 500 is connected to the first radiator 110 or the second radiator 120 and the hot portion 220 is connected to the third radiator 130, and may drive the compressor 250. That is, in the instant case, it may be said that the battery is a case of cooling the interior of the vehicle by use of refrigerant while maximally cooling by use of the external air.

Figure 8:
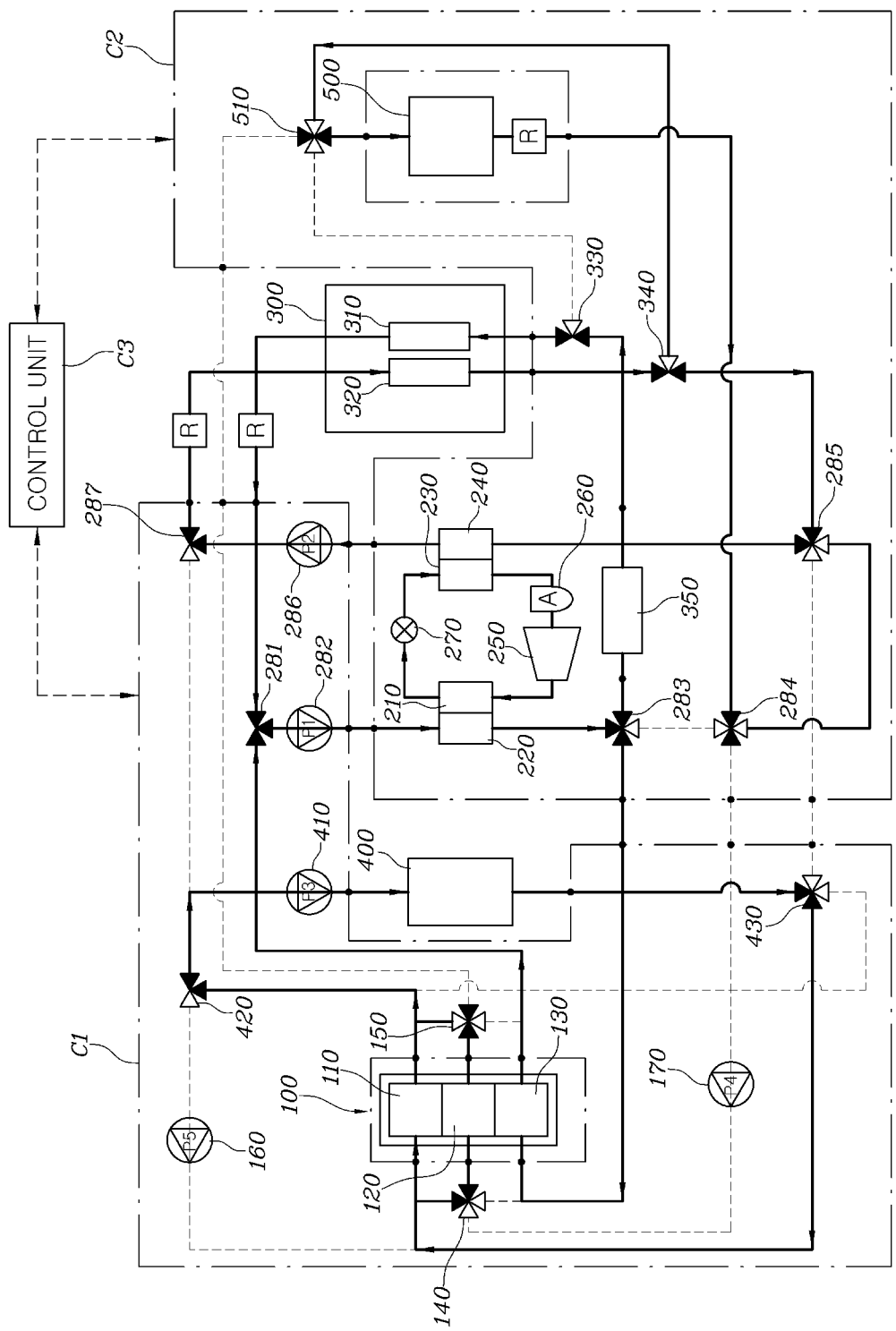

Meanwhile, as in FIG. 8, when both the high-voltage battery and the interior of the vehicle require the cooling of a certain reference value or more, the control unit C3 may control the connection module so that the hot portion 220 is connected to the radiator module 100 and drive the compressor 250, and may control so that the coolant circulates the cold portion 240, the cooling core 320, and the battery portion 500 in the present order.

That is, in the instant case, the electric component performs the necessary cooling through the external air by use of the first radiator 110 and the second radiator 120. As such, in the high-voltage battery and the interior of the vehicle that require more cooling, the compressor 250 is operated and the third radiator 130 and the hot portion 220 are connected to each other, and the coolant circulates the cold portion 240, the cooling core 320, and the battery portion 500 in the present order, such that the cooled coolant first flows through the cooling core 320 to cold the interior, and then cool the battery. Therefore, it is possible to appropriately perform the cooling according to the order in which the cold load is large (interior-battery-electric component).

Figure 9:
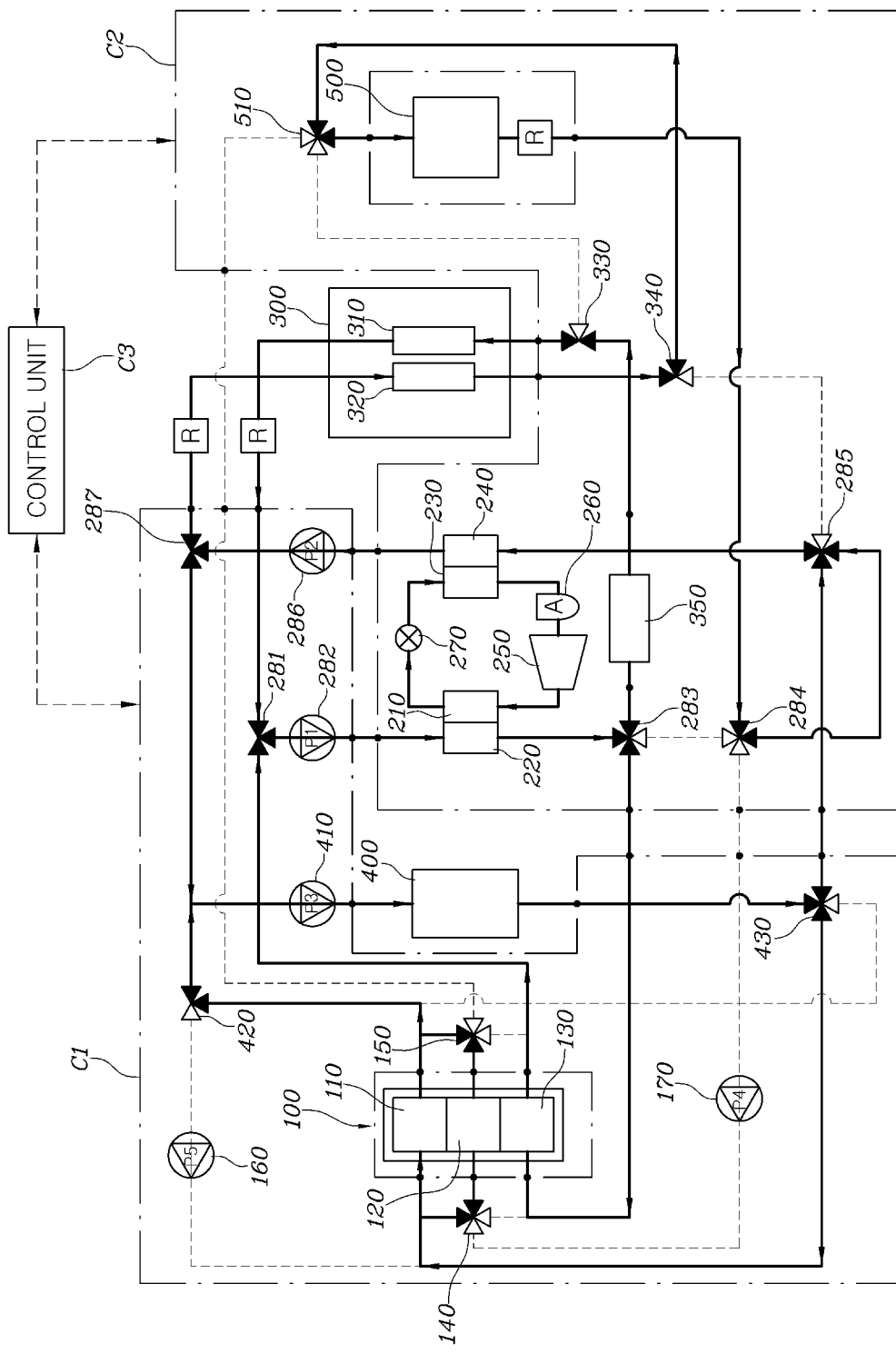

As such, as in FIG. 9, when all of the electric component, the high-voltage battery, and the interior of the vehicle require the cooling of a certain reference value or more, the control unit C3 may control the connection module so that the electric portion 400 is connected to the first radiator 110 and the second radiator 120 and the hot portion 220 is connected to the third radiator 130 and drive the compressor 250, and may control so that the coolant flowing through the cold portion 240 is branched to the electric portion 400 and the cooling core 320 and the coolant flowing through the cooling core 320 and the battery portion 500 and the coolant flowing through the electric portion 400 are joined together.

That is, FIG. 9 is a case where the cooling of the electric component is further required in the basically same state as the case of FIG. 8, and in the instant case, the control unit C3 controls the connection module so that the electric portion 400 is connected to the first radiator 110 and the second radiator 120 and the hot portion 220 is connected to the third radiator 130 and drives the compressor 250, and simultaneously, controls so that the coolant flowing through the cold portion 240 is branched to the electric portion 400 and the cooling core 320 to partially flow to the electric portion 400 as well, further enhancing the cooling capacity of the electric portion 400.

As such, the coolant flowing through the electric portion 400 may be again branched through the valve 430 to partially flow to the radiator module 100 and the remainder may be rejoined with the coolant flowing through the cooling core 320 and the battery portion 500 through the valve 285.

Figure 10:
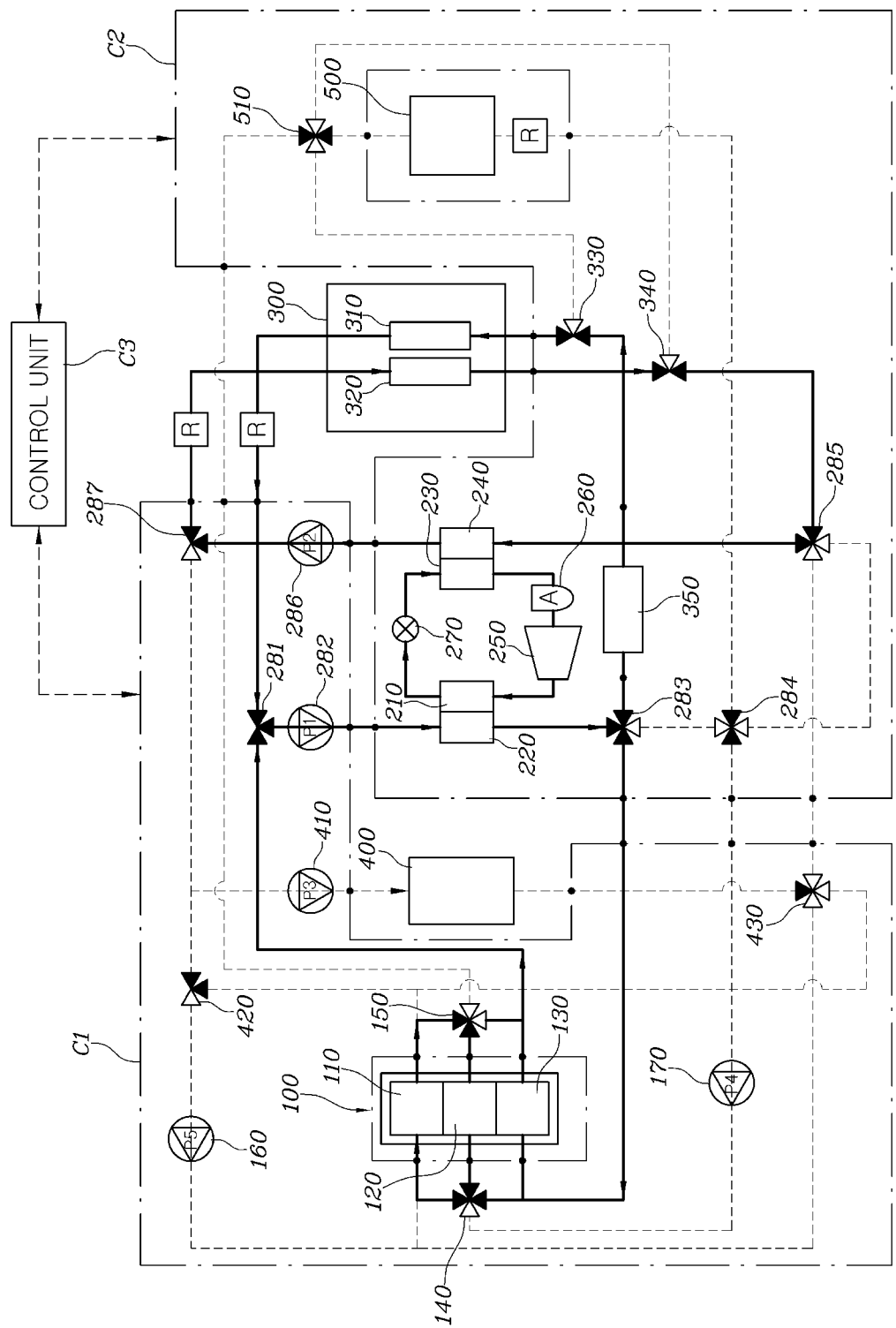

As such, as in FIG. 10, when the interior of the vehicle requires the maximum cold performance, the control unit C3 may control the connection module so that the hot portion 220 is connected to the first radiator 110, the second radiator 120, and the third radiator 130 and may drive the compressor 250. Therefore, the cold portion 240 may exert the maximum cooling performance, and flow the coolant flowing through the hot portion 220 to the heater core 310 slightly by use of the valves 281, 283, discharging the air of the mixed temperature into the interior of the vehicle as well.

Figure 11:
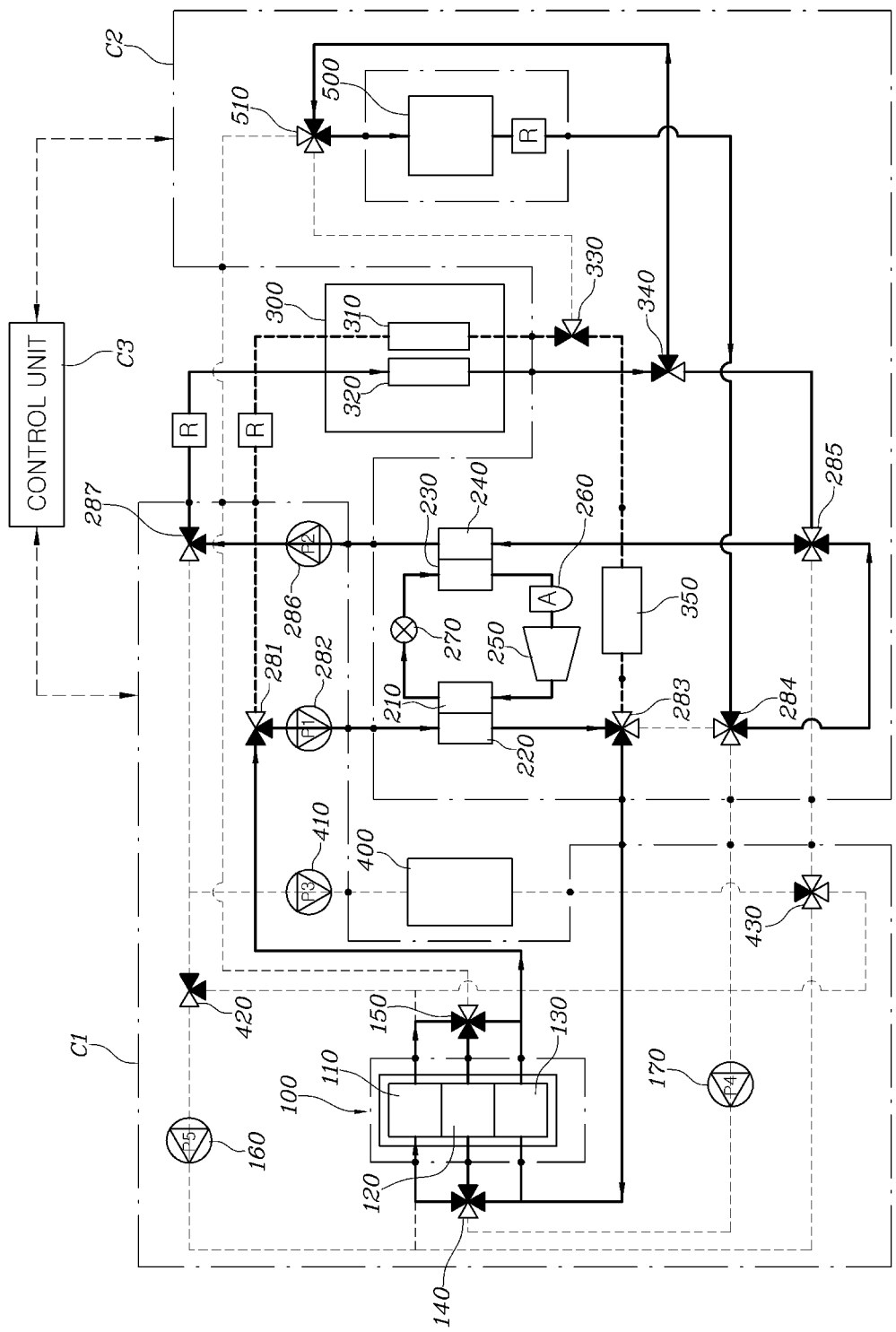

As such, as in FIG. 11, when the high-voltage battery is being charged in a state where the vehicle has been stopped, the control unit C3 may control the connection module so that the hot portion 220 is connected to the first radiator 110, the second radiator 120, and the third radiator 130 and drive the compressor 250, and may control so that the coolant circulates the cold portion 240, the cooling core 320, and the battery portion 500 in the present order. In the instant case, there may also be a case where the passenger gets on board during charging, but the coolant lines and the cooling core 320 are pre-cooled at the time point when boarding is expected during charging, obtaining the rapid effectiveness of the air-conditioning upon the passenger boarding in the future, which corresponds to a concept of using in the future by saving the energy.

Figure 12:
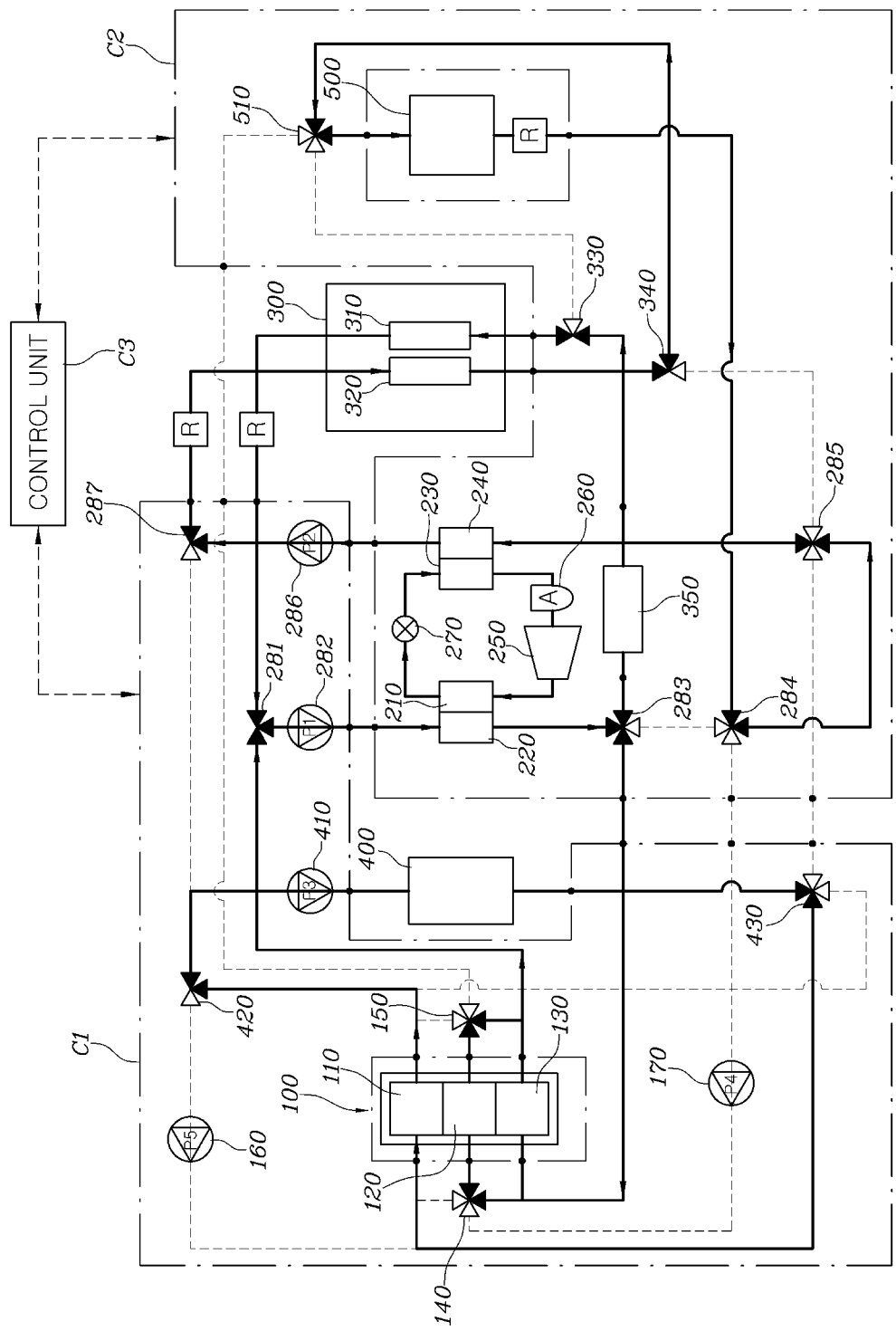

FIG. 12 is a case where the strong cooling of the interior of the vehicle and the battery is required and the electrical component also requires some degree of cooling because the external air temperature is high and the vehicle is traveling. In the instant case, as illustrated, the electric portion 400 performs the cooling by the external air through the first radiator 110, and the interior of the vehicle and the battery perform the cooling by use of the second radiator 120, the third radiator 130, and the compressor 250.

Figure 13:
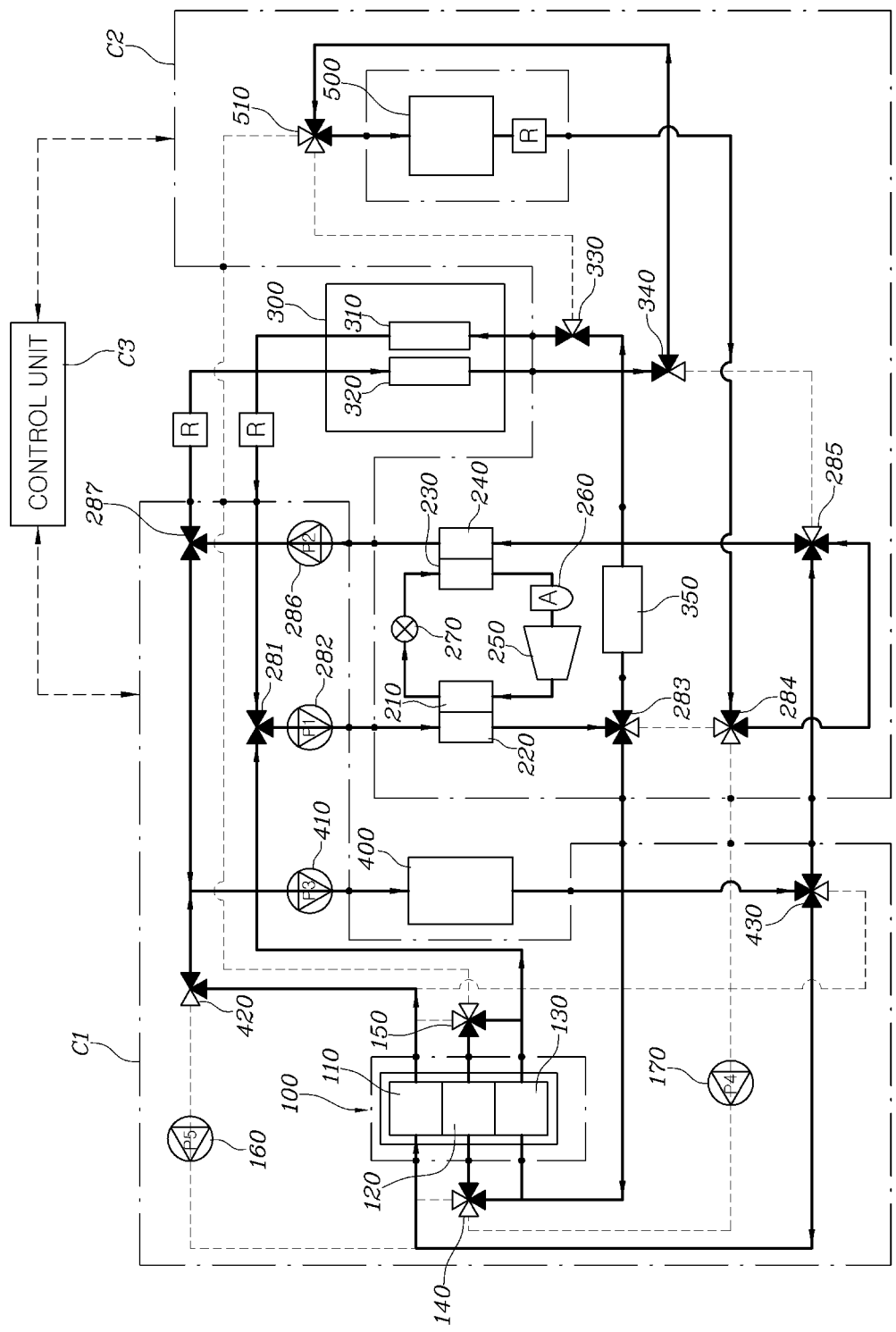

As such, FIG. 13 is a case where the cooling of the electric component is further required than the case of FIG. 12, that is, a case where a high output is required at a very hot day, and the basic portion is controlled in the same manner as in FIG. 12, but the coolant flowing through the cold portion 240 is branched to the electric portion 400 and the cooling core 320 by use of the valve 287 to partially flow to the electric portion 400 as well, further enhancing the cooling capacity of the electric portion 400. As such, the coolant flowing through the electric portion 400 may be again branched through the valve 430 to partially flow to the radiator module 100 and the remainder may be rejoined with the coolant flowing through the cooling core 320 and the battery portion 500 through the valve 285.

FIGS. 14 to 20 are diagrams relating to a heating and dehumidifying mode. When the internal heating is required, the control unit C3 controls so that the cold portion 240 does not flow the coolant to the cooling core 320 and supplies the coolant to the radiator module 100, enhancing the energy efficiency by use of the waste heat through the external air temperature. As such, the control unit C3 controls the connection module so that the hot portion 220 supplies the coolant to the heater core 310 and drives the compressor 250, performing the heating by use of the refrigerant and recovering the waste heat basically.

Figure 14:
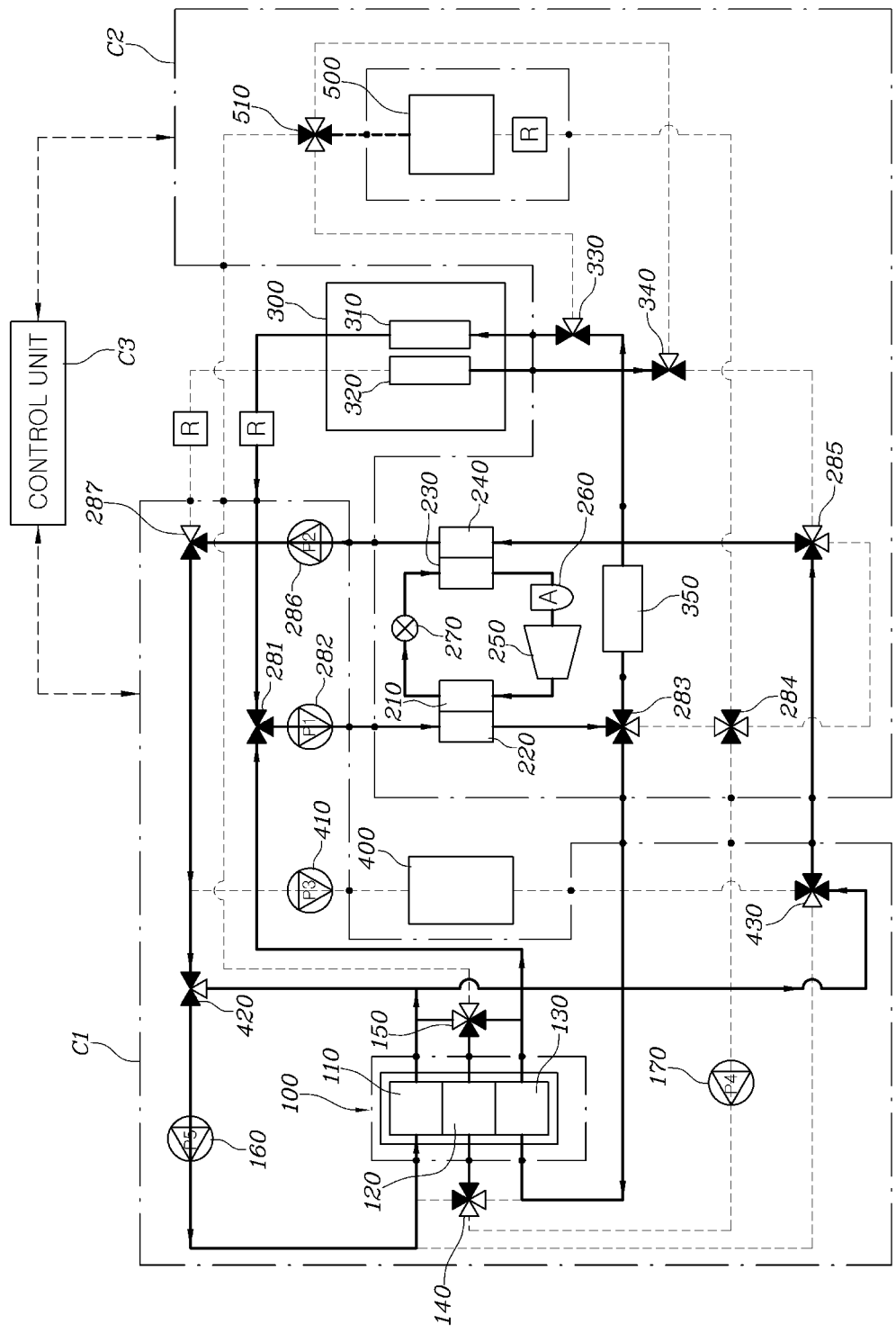

As illustrated in FIG. 14, the hot portion 220 may perform the heat-dissipation slightly by partially flowing the coolant to the third radiator 130 in some cases, further enhancing the efficiency. As such, the present function may be performed in advance when the vehicle is parked, also using the heat-storage function upon boarding in the vehicle in the future.

Figure 15:
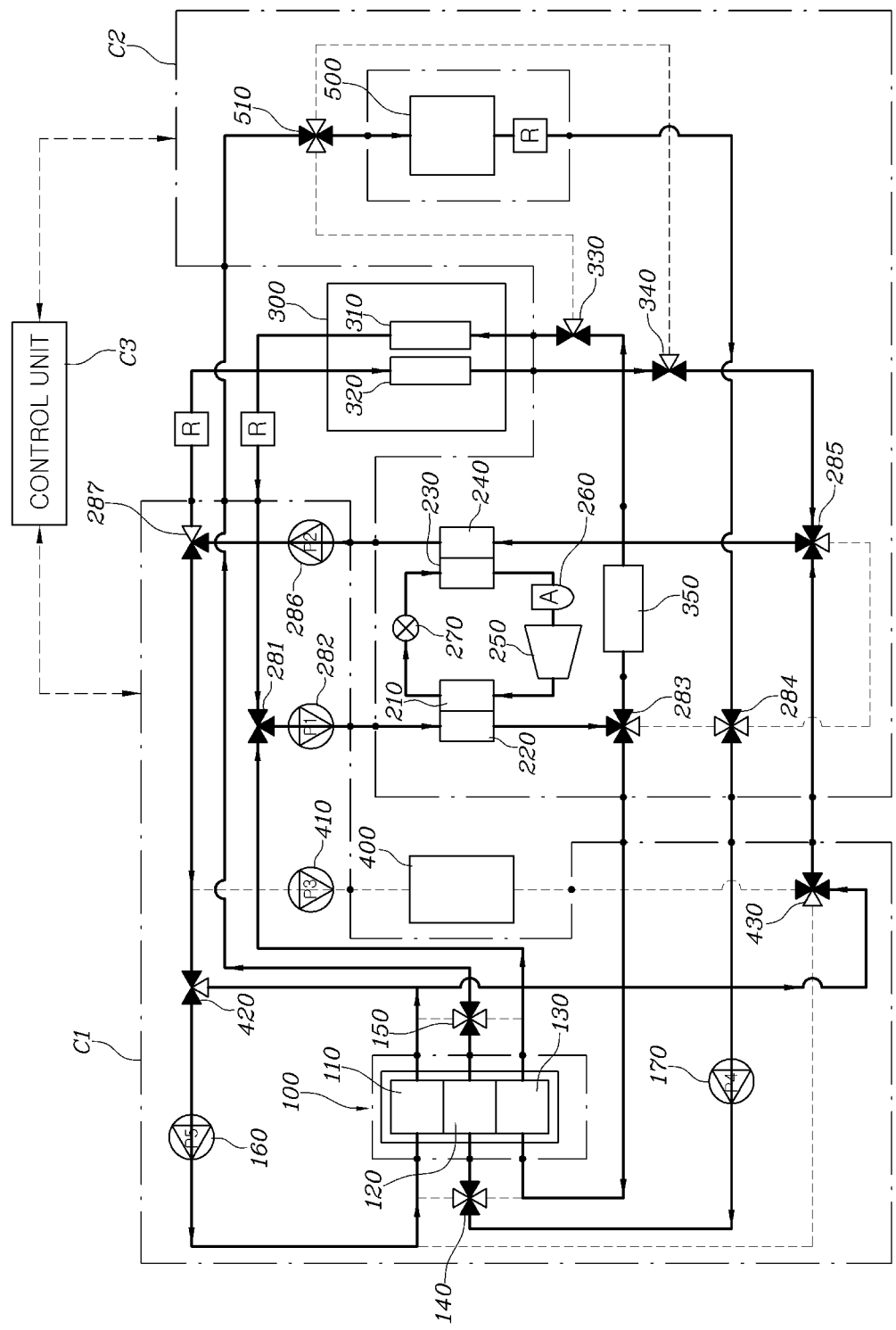

As such, FIG. 15 is a case where the control unit C3 simultaneously requires the internal heating and the cooling of the high-voltage battery. In the instant case, the control unit C3 may control the connection module so that the cold portion 240 supplies the coolant to the first radiator 110 to recover the waste heat, the battery portion 500 supplies the coolant to the second radiator 120 to perform the heat-dissipation through the external air, and the hot portion 220 supplies the coolant to the heater core 310, and may drive the compressor 250.

As such, furthermore, the hot portion 220 may flow the coolant slightly to the third radiator 130 to heat-dissipate as well. Furthermore, it is also possible to control the valves 285, 287 so that the coolant flowing through the cold portion 240 partially flow to the cooling core 320, implementing the dehumidifying function. That is, in the internal air-conditioning, the air first flows through the cooling core 320 to lower the absolute humidity and flows through the heater core 310 to lower the absolute humidity. That is, when the internal heating and dehumidification are simultaneously required, the control unit C3 may control the connection module so that the cold portion 240 supplies the coolant to the cooling core 320 and the radiator module 100 and the hot portion 220 supplies the coolant to the heater core 310, and may drive the compressor 250.

Figure 16:
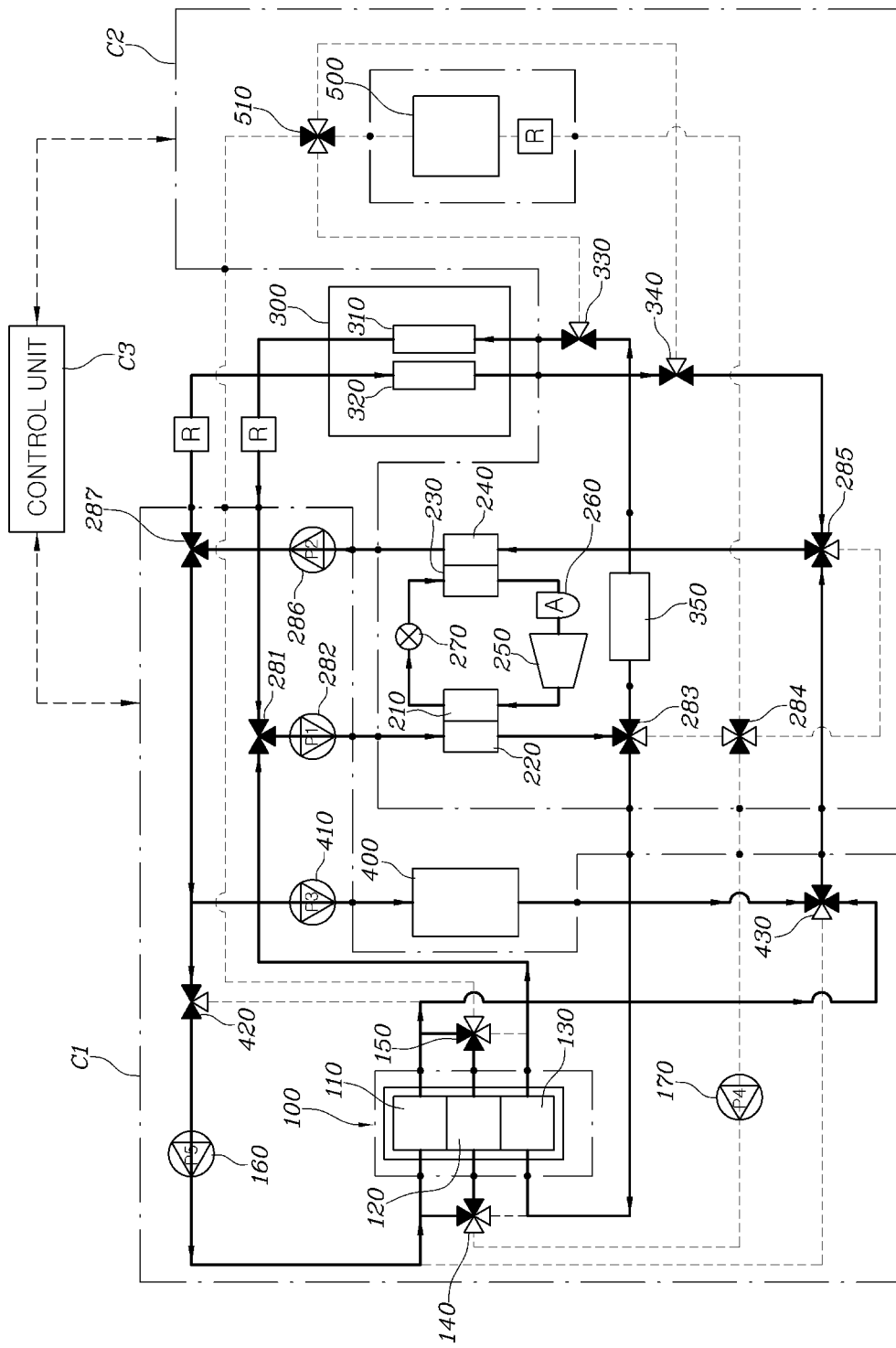

As such, as in FIG. 16, when the interior of the vehicle requires the heating but the electric component requires the cooling or when it is used for the heating by use of the waste heat of the electric component, the control unit C3 may control the connection module so that the coolant flowing through the cold portion 240 flows through the electric portion 400 and the radiator module 100 to be then joined together and the hot portion 220 supplies the coolant to the heater core 310, and may drive the compressor 250, when the internal heating is required. That is, the valves 287, 430 may be controlled so that the coolant flowing through the cold portion 240 flows to the electric portion 400 to absorb the waste heat of the electric component, and also flows to the first radiator 110 and the second radiator 120 to absorb the waste heat of the external air as well, enhancing the heating efficiency.

Figure 17:
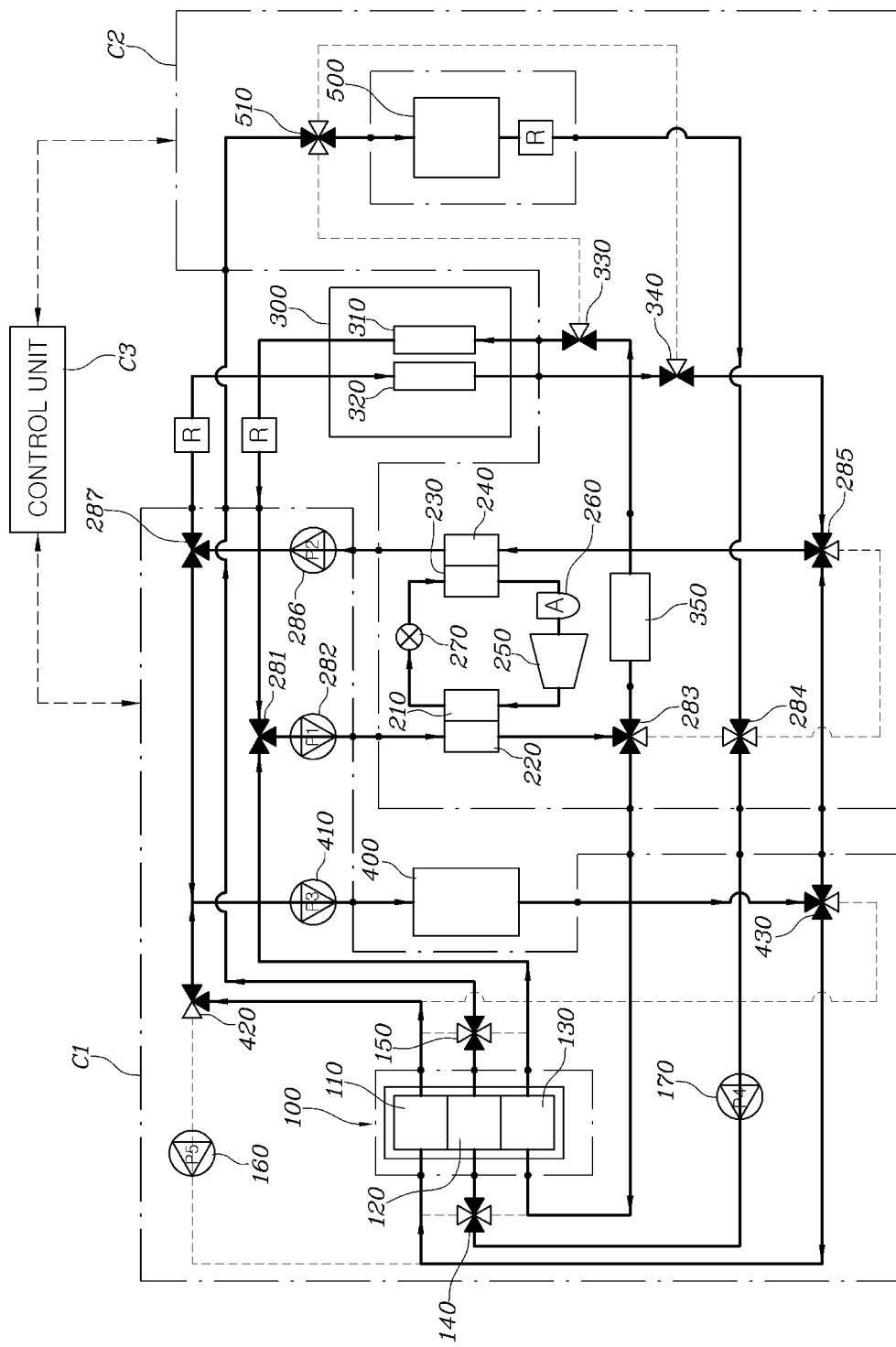

Meanwhile, when the internal heating and the cooling of the high-voltage battery are required in such a situation, a control is performed as in FIG. 17. In the instant case, the control is performed so that the coolant flowing through the cold portion 240 flows through the electric portion 400 and the first radiator 110 to recover the waste heat, and the coolant flowing through the hot portion 220 partially flows through the third radiator 130 to perform the heat-dissipation, and simultaneously, the coolant of the hot portion 220 mainly supplies the coolant to the heater core 310 to perform the heating, and the battery portion 500 supplies the coolant to the second radiator 120 to perform the heat-dissipation independently by use of the external air.

Meanwhile, the air-conditioning apparatus configured for the vehicle of the present invention further includes an electric heater 350 provided on the coolant line for connecting the hot portion 220 and the heater core 310 to heat the coolant, and when the internal heating and the temperature-rising of the high-voltage battery are required, the control unit C3 may control so that the cold portion 240 supplies the coolant to the radiator module 100 and the coolant flowing through the hot portion 220 is branched to flow through the electric heater 350 and the battery portion 500, respectively to be then joined together to flow to the heater core 310.

Figure 18:
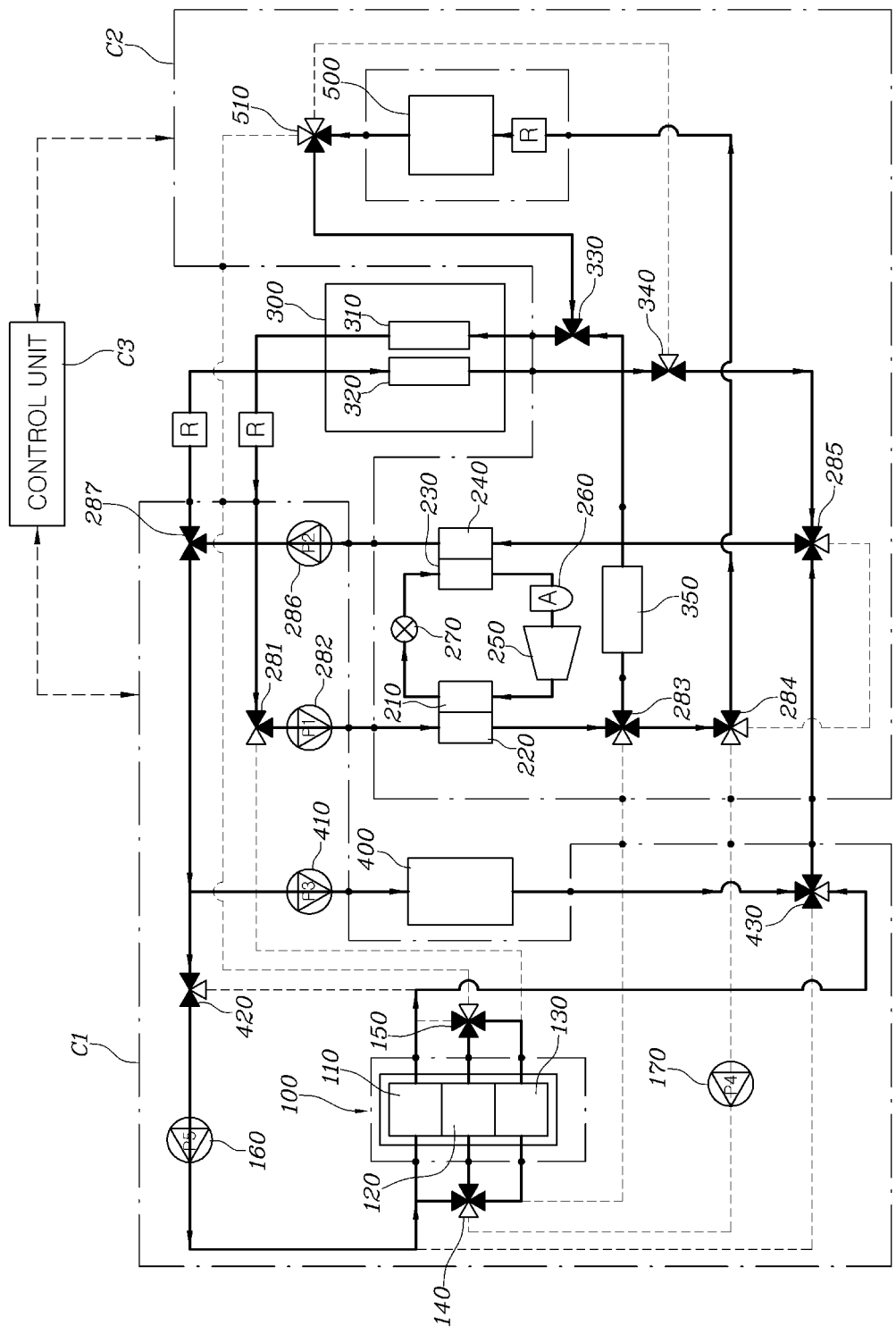

That is, as in FIG. 18, there is a case where it is difficult to fulfill the necessary heating with only the refrigerant cycle in a very cold day, and in the instant case, it is possible to further heat the coolant through the electric heater 350 and then flow it to the heater core 310, securing the necessary heating performance. Furthermore, as in FIG. 18, it is also possible to partially flow the coolant of the cold portion 240 to the cooling core 320 to perform dehumidification, and as in FIG. 19, it is also possible to perform only the heating rather than the dehumidification.

As such, in the instant case, when the heating of the battery is required, the temperature of the coolant having passed through the electric heater 350 is too high in the battery, such that rather than using the above, the coolant flowing through the hot portion 220 is used not only to protect the battery but also to perform the heating. For the present purpose, the coolant flowing through the hot portion 220 may be branched to flow through the electric heater 350 and the battery portion 500, respectively to be then joined together to flow to the heater core 310 again.

Figure 19:
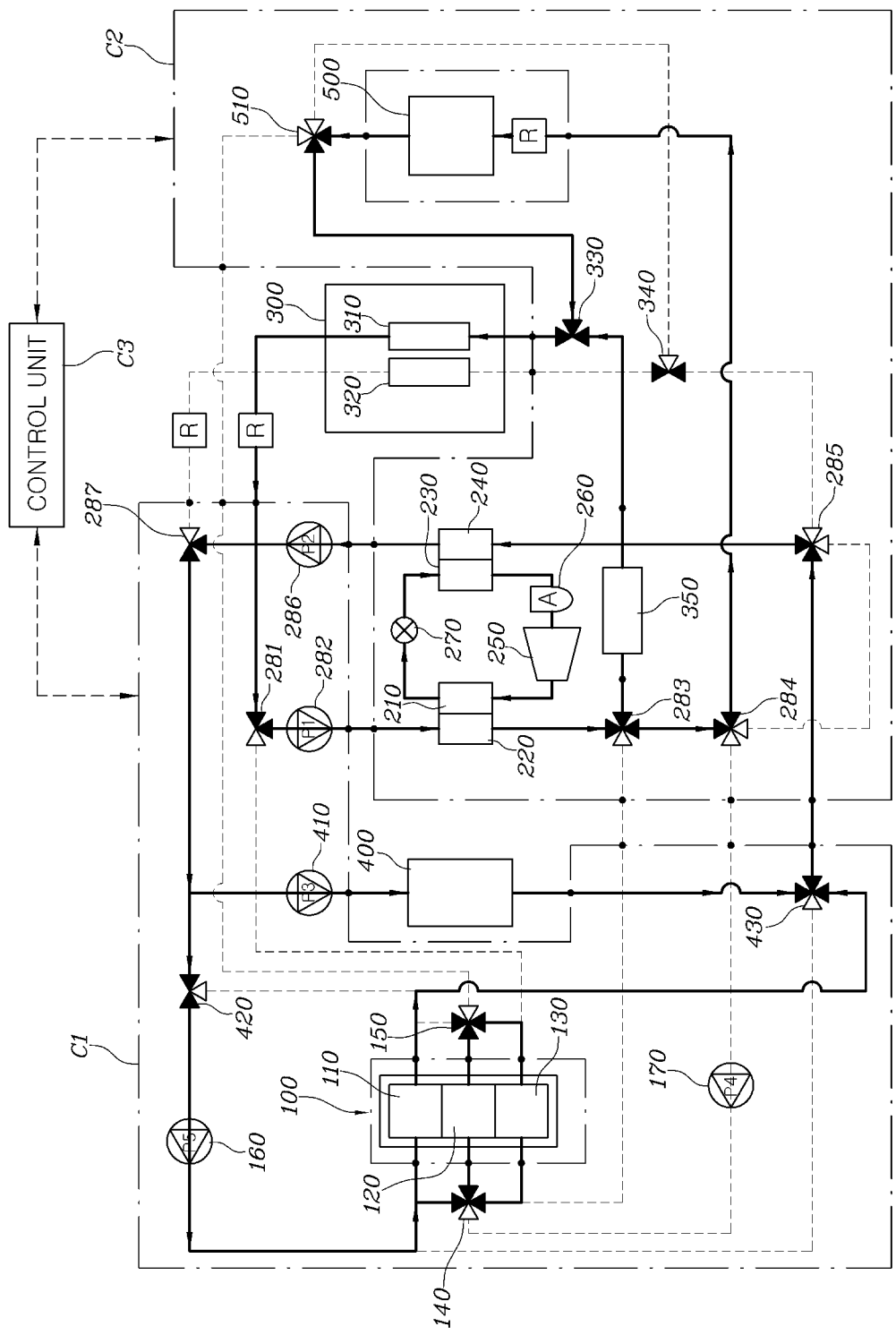
Figure 20:
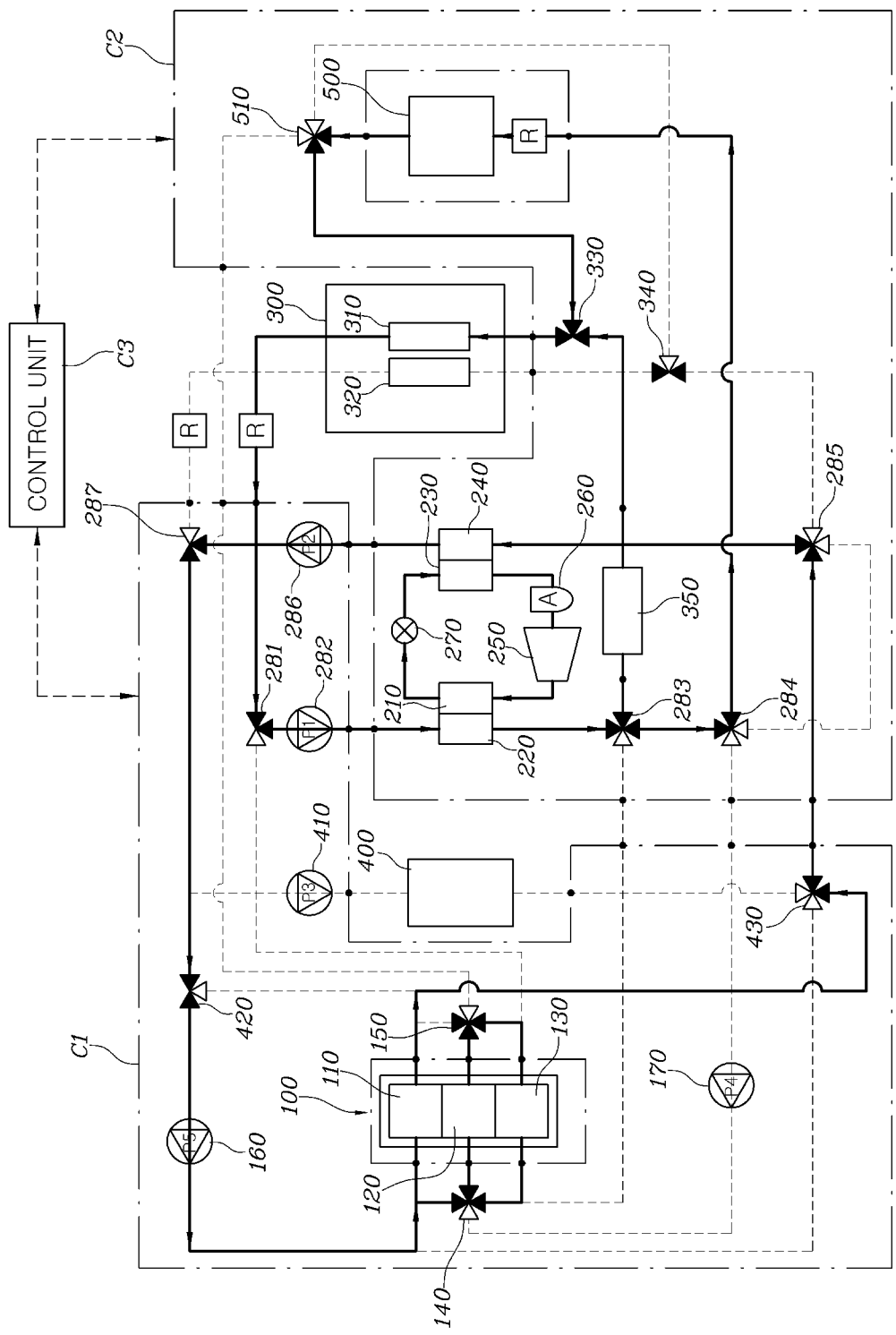

Furthermore, as in FIG. 19, when the vehicle is stopped and the internal heating is required, the control unit C3 may control the control module C so that the coolant flowing through the cold portion 240 flows through the radiator module 100 and the coolant flowing through the hot portion 220 flows through the electric heater 350 and the heater core 310 and may drive the compressor 250, performing the internal heating or performing the heat storage before getting on board.

According to the air-conditioning apparatus configured for the vehicle of the present invention, it is possible to use by effectively dividing or integrating the radiator, maximizing the air-conditioning efficiency, and significantly reducing the amount of refrigerant used to maximally cope with the environmental problems as well.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference value to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An air-conditioning apparatus for a vehicle, the apparatus comprising:
    a radiator module including a first radiator, a second radiator, and a third radiator;
    a refrigerant module having a compressor, an expansion valve, a condenser, and an evaporator, through which refrigerant is circulated;
    a hot portion through which coolant flows and for heat-exchanging with the condenser and a heater core of an internal air-conditioning module;
    a cold portion through which the coolant flows and for heat-exchanging with the evaporator and a cooling core of the internal air-conditioning module;
    an electric portion through which the coolant flows and for heat-exchanging with an electric component;
    a battery portion through which the coolant flows and for heat-exchanging with a battery;
    a connection module having a plurality of coolant lines and a valve, and configured for selectively fluidically-connecting the hot portion, the electric portion, or the battery portion to at least one of the first radiator, the second radiator, and the third radiator; and
    a control unit configured of controlling operations of the compressor and the valve.

2. The air-conditioning apparatus for the vehicle according to claim 1,
    wherein the control unit is configured to control the connection module so that a number of the radiators to which the electric portion or the battery portion is connected is changed according to an amount at which heat-dissipation of the electric component or the battery is required.

3. The air-conditioning apparatus for the vehicle according to claim 1,
    wherein when all of the electric component, the battery, and an interior of the vehicle require the cooling, the control unit is configured to control the connection module so that the electric portion is fluidically connected to the first radiator, the battery portion is fluidically connected to the second radiator, and the hot portion is fluidically connected to the third radiator, and configured to drive the compressor.

4. The air-conditioning apparatus for the vehicle according to claim 1,
    wherein when the battery and an interior of the vehicle require the cooling, the control unit is configured to control the connection module so that the battery portion is fluidically connected to the first radiator or the second radiator and the hot portion is fluidically connected to the third radiator, and drives configured to drive the compressor.

5. The air-conditioning apparatus for the vehicle according to claim 1,
    wherein when the battery and an interior of the vehicle require the cooling of at least a predetermined reference value, the control unit is configured to control the connection module so that the hot portion is connected to the radiator and drives the compressor, and controls so that the coolant circulates in an order of the cold portion, the cooling core, and the battery portion.

6. The air-conditioning apparatus for the vehicle according to claim 1,
    wherein when all of the electric component, the battery, and an interior of the vehicle require the cooling of at least a predetermined reference value, the control unit is configured to control the connection module so that the electric portion is fluidically connected to the first radiator and the second radiator and the hot portion is fluidically connected to the third radiator and drives the compressor, and controls so that the coolant flowing through the cold portion is branched to the electric portion and the cooling core, and the coolant flowing through the cooling core and the battery portion and the coolant flowing through the electric portion are joined together.

7. The air-conditioning apparatus for the vehicle according to claim 1,
    wherein when an interior of the vehicle requires a maximum cold performance, the control unit is configured to control the connection module so that the hot portion is fluidically connected to the first radiator, the second radiator, and the third radiator, and drives configured to drive the compressor.

8. The air-conditioning apparatus for the vehicle according to claim 1,
    wherein when the battery is being charged in a state where the vehicle has been stopped, the control unit is configured to control the connection module so that the hot portion is fluidically connected to the first radiator, the second radiator, and the third radiator and drives the compressor, and controls so that the coolant circulates in an order of the cold portion, the cooling core, and the battery portion.

9. The air-conditioning apparatus for the vehicle according to claim 1,
    wherein when an internal heating of the vehicle is required, the control unit is configured to control the connection module so that the cold portion does not flow the coolant to the cooling core and supplies the coolant to the radiator module and the hot portion supplies the coolant to the heater core, and configured to drive the compressor.

10. The air-conditioning apparatus for the vehicle according to claim 1,
    wherein when an internal heating of the vehicle and the cooling of the battery are required, the control unit is configured to control the connection module so that the cold portion and the battery portion flow the coolant to the radiator module and the hot portion supplies the coolant to the heater core, and configured to drive the compressor.

11. The air-conditioning apparatus for the vehicle according to claim 1,
    wherein when an internal heating of the vehicle and dehumidification are required, the control unit is configured to control the connection module so that the cold portion supplies the coolant to the cooling core and the radiator module and the hot portion supplies the coolant to the heater core, and configured to drive the compressor.

12. The air-conditioning apparatus for the vehicle according to claim 1,
    wherein when an internal heating of the vehicle is required, the control unit is configured to control the connection module so that the coolant flowing through the cold portion flows through the electric portion and the radiator module to be then joined together and the hot portion supplies the coolant to the heater core, and configured to drive the compressor.

13. The air-conditioning apparatus for the vehicle according to claim 1,
wherein when an internal heating of the vehicle and the cooling of the battery are required, the control unit is configured to control the connection module so that the coolant flowing through the cold portion flows through the electric portion, the first radiator, and the third radiator, the hot portion supplies the coolant to the heater core, and the battery portion supplies the coolant to the second radiator, and configured to drive the compressor.

14. The air-conditioning apparatus for the vehicle according to claim 1, further including an electric heater provided on the coolant line for fluidically connecting the hot portion with the heater core to heat the coolant,
wherein when an internal heating of the vehicle and temperature-rising of the battery are required, the control unit is configured to control so that the cold portion supplies the coolant to the radiator module and the coolant flowing through the hot portion is branched to flow through the electric heater and the battery portion, respectively to be then joined together to flow to the heater core.

15. The air-conditioning apparatus for the vehicle according to claim 1,
wherein when the vehicle is stopped and an internal heating of the vehicle is required, the control unit is configured to control the control module so that the coolant flowing through the cold portion flows to the radiator module and the coolant flowing through the hot portion flows to the electric heater and the heater core, and configured to drive the compressor.

\* \* \* \* \*